United States Patent [19]
Nishiumi et al.

[11] Patent Number: 5,903,257
[45] Date of Patent: May 11, 1999

[54] OPERATING DEVICE AND IMAGE PROCESSING SYSTEM USING SAME

[75] Inventors: Satoshi Nishiumi; Kazuo Koshima; Mitsunori Yamada, all of Kyoto, Japan

[73] Assignee: Nintendo Co., Ltd., Kyoto, Japan

[21] Appl. No.: 08/836,787

[22] PCT Filed: Oct. 9, 1996

[86] PCT No.: PCT/JP96/02932

§ 371 Date: May 16, 1997

§ 102(e) Date: May 16, 1997

[87] PCT Pub. No.: WO97/14089

PCT Pub. Date: Apr. 17, 1997

[30] Foreign Application Priority Data

Oct. 9, 1995 [JP] Japan .................................. 7-288006
Jun. 13, 1996 [JP] Japan .................................. 8-176005

[51] Int. Cl.$^6$ .............................. G09G 5/00; G09G 5/08; A63F 9/22
[52] U.S. Cl. .......................... 345/157; 345/156; 345/161; 463/38; 463/44
[58] Field of Search .................. 345/156–162; 463/36–47; 273/148 B

[56] References Cited

U.S. PATENT DOCUMENTS

D. 316,879  5/1991  Shulman et al. .
D. 317,946  7/1991  Tse .

(List continued on next page.)

FOREIGN PATENT DOCUMENTS 268 419   5/1988   European Pat. Off. .
0 470 615 2/1992   European Pat. Off. .
553 532   8/1993   European Pat. Off. .
685 246   12/1995  European Pat. Off. .
724 220   7/1996   European Pat. Off. .
40 18 052 12/1990  Germany .

(List continued on next page.)

OTHER PUBLICATIONS

*3D Ballz Instruction Booklet*, Accolade, San Jose, California, #3050–00231 Rev. A 6 Photographs of Sony Play Station: 1) top case and compact disk; 2) hand controller; 3) internal circuit boards (top view); 4) internal circuit boards (top view); 5) compact disk reader (bottom view); and internal main circuit board (bottom view).
*Knuckles Chaotix Intruction Manual*, SEGA, Redwood City, California, #84503 (1995).
*Nitendo Power*, vol. 30, p. 22, PilotWings article.
*Nintendo Power*, vol. 31, p. 35, PilotWings article.
*Nintendo Power*, vol. 31, pp. 74–76, PilotWings article.
*Nintendo Power*, vol. 38, p. 25, PilotWings article.
*Nintendo Power*, vol. 46, PilotWings article.
*PilotWings Instruction Booklet*, Super Nintendo Entertainment System, SNS–PW–USA, copyright 1991.
*PilotWings, It's a Festival of Flight*, Top Secret Password Nintendo Playr's Guide, pp. 82–83 and 160, copyright 1991.
*PilotWings, Soar with the Flight Club*, Super Nintendo Entertainment System Play's Guide, pp. 100–105, copyright 1991.
*Sega Genesis 32X Instruction Manual*, SEGA, Redwood City California, #672–2116 (1994).

(List continued on next page.)

*Primary Examiner*—Jeffery Brier
*Assistant Examiner*—David L. Lewis
*Attorney, Agent, or Firm*—Nixon & Vanderhye P.C.

[57] ABSTRACT

An operating device is connected to an image processing apparatus that generates image data to be displayed on a display according to a program. The operating device supplies a signal for varying the image data to be generated by the image processing apparatus. A joystick includes a lever and a disc interlocked therewith, and the rotation of the disc is detected by a photo-interrupter. Pulses from the photo-interrupter are counted by a resettable counter. A reset signal is supplied to the counter when three buttons are simultaneously depressed, when a power supply is turned on, or otherwise when a signal is received from a CPU of the image processing apparatus.

40 Claims, 28 Drawing Sheets

U.S. PATENT DOCUMENTS

| | | |
|---|---|---|
| D. 357,712 | 4/1995 | Wu . |
| D. 363,092 | 10/1995 | Hung . |
| D. 375,326 | 11/1996 | Yokoi et al. . |
| 4,359,222 | 11/1982 | Smith, III et al. . |
| 4,469,330 | 9/1984 | Asher . |
| 4,552,360 | 11/1985 | Brompley et al. . |
| 4,587,510 | 5/1986 | Kim . |
| 4,659,313 | 4/1987 | Kuster et al. . |
| 4,748,441 | 5/1988 | Brzezinski . |
| 4,868,780 | 9/1989 | Stern . |
| 4,887,966 | 12/1989 | Gellerman . |
| 4,924,216 | 5/1990 | Leung . |
| 4,933,670 | 6/1990 | Wislocki . |
| 4,974,192 | 11/1990 | Face et al. . |
| 4,976,429 | 12/1990 | Nagel . |
| 5,001,932 | 3/1991 | Hall-Tipping . |
| 5,012,230 | 4/1991 | Yasuda . |
| 5,046,739 | 9/1991 | Reichow . |
| 5,203,563 | 4/1993 | Loper, III . |
| 5,207,426 | 5/1993 | Inoue et al. . |
| 5,213,327 | 5/1993 | Kitaue . |
| 5,245,320 | 9/1993 | Bouton . |
| 5,259,626 | 11/1993 | Ho ................................... 273/148 B |
| 5,286,024 | 2/1994 | Winblad ........................ 273/148 B |
| 5,290,034 | 3/1994 | Hineman . |
| 5,390,937 | 2/1995 | Sakaguchi et al. . |
| 5,436,640 | 7/1995 | Reeves . |
| 5,451,053 | 9/1995 | Garrido .......................... 273/148 B |
| 5,459,487 | 10/1995 | Bouton ................................. 345/156 |
| 5,473,325 | 12/1995 | McAlindon ........................ 345/161 |
| 5,515,044 | 5/1996 | Glatt . |
| 5,551,693 | 9/1996 | Goto et al. . |
| 5,563,629 | 10/1996 | Caprara . |
| 5,593,350 | 1/1997 | Bouton et al. . |
| 5,607,157 | 3/1997 | Nagashima . |
| 5,615,083 | 3/1997 | Burnett . |
| 5,624,117 | 4/1997 | Ohkubo et al. . |
| 5,632,680 | 5/1997 | Chung ................................. 345/156 |
| 5,640,177 | 6/1997 | Hsu ..................................... 345/161 |
| 5,643,087 | 7/1997 | Marcus et al. ................. 273/148 B |
| 5,649,862 | 7/1997 | Sakaguchi et al. .................... 463/44 |
| 5,653,637 | 8/1997 | Tai . |
| 5,706,029 | 1/1998 | Tai . |
| B1 4,870,389 | 6/1997 | Ishiwata et al. . |

FOREIGN PATENT DOCUMENTS

| | | |
|---|---|---|
| 50-22475 | 3/1975 | Japan . |
| 57-18236 | 1/1982 | Japan . |
| 57-2084 | 1/1982 | Japan . |
| 57-136217 | 8/1982 | Japan . |
| 59-40258 | 3/1984 | Japan . |
| 59-121500 | 7/1984 | Japan . |
| 61-16641 | 1/1986 | Japan . |
| 61-198286 | 9/1986 | Japan . |
| 61-185138 | 11/1986 | Japan . |
| 62-269221 | 11/1987 | Japan . |
| 2-41342 | 3/1990 | Japan . |
| 2-68404 | 5/1990 | Japan . |
| 3-16620 | 1/1991 | Japan . |
| 3-248215 | 11/1991 | Japan . |
| 4-26432 | 1/1992 | Japan . |
| 4-20134 | 2/1992 | Japan . |
| 4-42029 | 2/1992 | Japan . |
| 4-104893 | 9/1992 | Japan . |
| 4-29148 | 10/1992 | Japan . |
| 5-100759 | 4/1993 | Japan . |
| 5-19925 | 5/1993 | Japan . |
| 5-177057 | 7/1993 | Japan . |
| 5-241502 | 9/1993 | Japan . |
| 6-23148 | 2/1994 | Japan . |
| 6-54962 | 3/1994 | Japan . |
| 6-68238 | 3/1994 | Japan . |
| 6-110602 | 4/1994 | Japan . |
| 6-114683 | 4/1994 | Japan . |
| 6-190145 | 7/1994 | Japan . |
| 6-190147 | 7/1994 | Japan . |
| 6-205010 | 7/1994 | Japan . |
| 6-285259 | 10/1994 | Japan . |
| 6-315095 | 11/1994 | Japan . |
| 7-104930 | 4/1995 | Japan . |
| 7-222865 | 8/1995 | Japan . |
| 7-288006 | 10/1995 | Japan . |
| 7-317230 | 12/1995 | Japan . |
| 8-45392 | 2/1996 | Japan . |
| 2 244 546 | 12/1991 | United Kingdom . |
| 2 263 802 | 8/1993 | United Kingdom . |
| WO 92/09347 | 6/1992 | WIPO . |
| WO 94/12999 | 6/1994 | WIPO . |
| WO97/17651 | 5/1997 | WIPO . |

OTHER PUBLICATIONS

*Sega Genesis Instruction Manual*, SEGA, Hayward, California,#3701–926–0–01 (1994).

*Sonic 2 the Hedgehog Instruction Manual*, SEGA, Hayward, California, #672–0944 3701–925–0–01 (1992).

Sony PlayStation Instruction Manual, and informational materials, Sony Computer Entertainment Inc. 1995.

"1" SIGNAL

"0" SIGNAL

FIG. 15

| 1 BYTE | B | A | G | START | ↑ | ↓ | ← | → |
|---|---|---|---|---|---|---|---|---|
| 2 BYTE | JSRST | 0 | L | R | E | D | C | F |
| 3 BYTE | X ORDINATE ||||||||
| 4 BYTE | Y ORDINATE ||||||||

PHYSICAL COORDINATE OF JOYSTICK

DISPLAY SCREEN

PHYSICAL COORDINATE OF JOYSTICK

DISPLAY SCREEN

OPERATING DEVICE AND IMAGE PROCESSING SYSTEM USING SAME

FIELD OF THE INVENTION

This invention relates to an operating device and an image processing system using same. More particularly, this invention is concerned with an operating device (joystick) with which the function is extendable for an image processing apparatus such as a personal computer, a video game machine, and so on, to enable transmission and reception of any data.

BACKGROUND AND SUMMARY OF THE INVENTION

Conventional joysticks are structured to detect in which direction and to what degree an operating member thereof is inclined. The "home" or neutral position to which the operating member returns when not operated by an operator is the origin point from which inclination of the operating member is measured. Because the origin point is fixed and not alterable by a user, the user cannot freely modify the location of the origin point.

It is therefore an object of the present invention to provide an operating device in which errors incurred through mass production can readily corrected and the origin point of the operating device can be determined and modified freely by an user.

It is another object of the present invention to provide an image processing system using such an operating device.

An operating device is connected during use to an image processing apparatus (10) that generates image data to be displayed on a display according to a program, to supply a signal for providing variation to the image data to be generated by an image processing apparatus, the operating device comprising: an operating member (451), a rotating member (457, 467), a rotation detecting means (459, 469), a count means (444X, 444Y), a reset signal generating means (442, 443, 447, 448), and a transfer means (442, 445, 43).

The operating member is supported to be tilt-operated by an operator so as to incline within a predetermined range and rest, when not operated by the operator, at a predetermined neutral position. The rotating member is arranged for rotation depending upon an inclination amount of the operating member. The rotation detecting means detect a rotational state of the rotating member. The count means varies a count value thereof depending on a rotational amount of the rotating member detected by the rotation detecting means. The reset signal generating means generates a reset signal to reset the count value of the count means. The transfer means transfers the count value counted by the count means to the image processing apparatus.

An image processing system includes an image processing apparatus for generating image data to be displayed on a display according to a program, and an operating device for connecting during use to the image processing apparatus so as to supply a signal for the image data to be generated by the image processing apparatus. The image processing apparatus (10) includes a program memory (20), a first receiving means (173), a central processing means (11), a first transmitting means (172), and an image signal generating means (16), and wherein the operating device (40) includes an operating member (451), a rotating member (457, 467), a rotation detecting means (459, 469), a count means (444X, 444Y), a reset signal generating means (442, 443, 447, 448), a second receiving means (173), a transfer means (171), and a second transmitting means (172).

The program memory is stored with a program for image processing. The first receiving means receives data generated by the operating device. The central processing means generates command data according to the program stored in the program memory, and generating image data depending upon the program and the data received by the first receiving means. The first transmitting means transmits the command data generated by the central processing means to the operating device. The image signal generating means generates an image signal for displaying an image on the display depending upon the image data from the central processing means. The operating member is supported to be tilt-operated to be inclined within a predetermined range by the operator and rested, when not operated by an operator, at a predetermined position. The rotating member is arranged for rotation depending upon an inclination amount of the operating member. The rotation detecting means detects a rotational state of the rotating member. The count means has a count value varied depending on the rotational amount of the rotating member detected by the rotation detecting means. The reset signal generating means generates a reset signal to reset the count value of the count means. The second receiving means receives the command data transmitted from the first transmitting means. The transfer means outputs the count value data counted by the count means in response to reception of predetermined command data by the second receiving means. The second transmitting means transmits the count value data output by the transfer means to the image processing apparatus.

When the operator holds the operating device in hand and inclines the operating member, the rotating member rotates depending upon the inclination. As a result, the rotation detecting means generates an electric signal responsive to the rotation of the rotating member. In response to the electric signal, the count means counts the rotational amount of the rotating member. The reset signal generating means generates a reset signal to reset the count value of the count means. The transfer means transfers the count value of the count means to the image processing apparatus. In response to this, the image processing apparatus generates an image signal varied depending on the count value.

The central processing means generates command data according to the program stored in the program memory. The first transmitting means transmits the command data to the operating device. The transmitted command signal is received by the second receiving means. The transfer means, in response to the reception of the commaqnd signal by the receiving means, outputs data of the count value counted by the count means. The count value data is transmitted by the second transmitting means to the image processing apparatus. This transmitted count value data is received by the first receiving means. The central processing means generates image data based on this count value data and a program. In accordance with this image data, the image signal generating means generates an image signal for displaying an image on the display.

According to the present invention, the number of program steps for image processing can be reduced so that the program is simplified and the shortening of programmer operating time is shortened and operation is simplified.

The above and other objects, features, aspects, and advantage of the present invention will become more apparent from the ensuing detailed description of the present invention when taken in conjunction with the accompanying drawings.

BRIEF DESCRIPTION OF THE DRAWINGS

FIG. 15 is an illustrative view showing data of the analog joystick and respective buttons of the controller;

DETAILED DESCRIPTION

Figure 1:
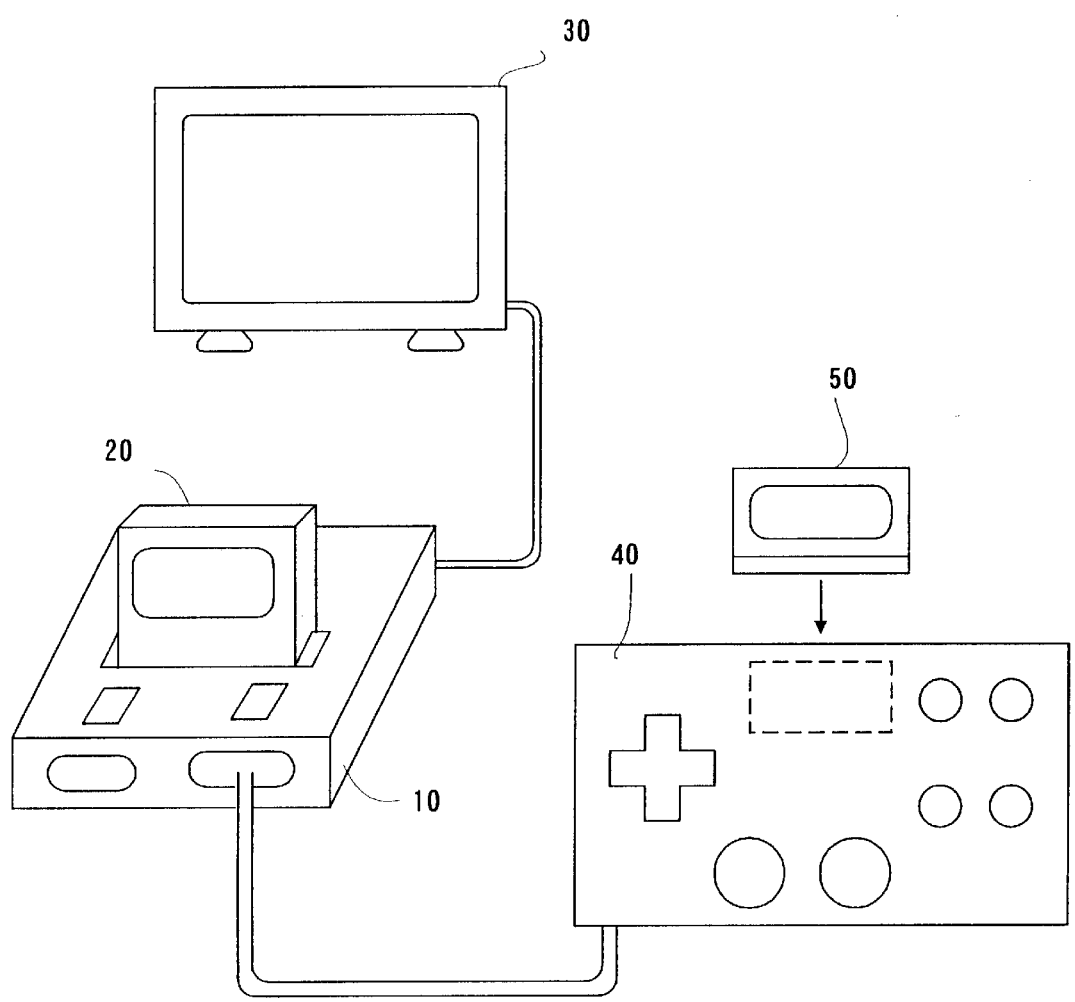
FIG. 1 is a schematic illustrative view showing one embodiment of the present invention.

Referring to FIG. 1, there is illustrated an external view showing a system structure of an image processing system according to one embodiment of the present invention. The image processing system is for example a video game system, which inclusively comprises an image processing apparatus main body 10, a ROM cartridge 20 as one example of an external memory device, a display 30 as one example of a display means connected to the image processing apparatus main body 10, a controller 40 as one example of an operating means, and a RAM cartridge 50 as one example of an extension device detachably attached to the controller 40. Incidentally, the external memory device stores image data and program data for image processing for games, and audio data for music, effect sound, etc. A CD-ROM or a magnetic disc may alternatively be employed in place of the ROM cartridge. Where the image processing system of this example is applied to a personal computer, an input device such as a keyboard or a mouse is used as the operating means.

Figure 2:
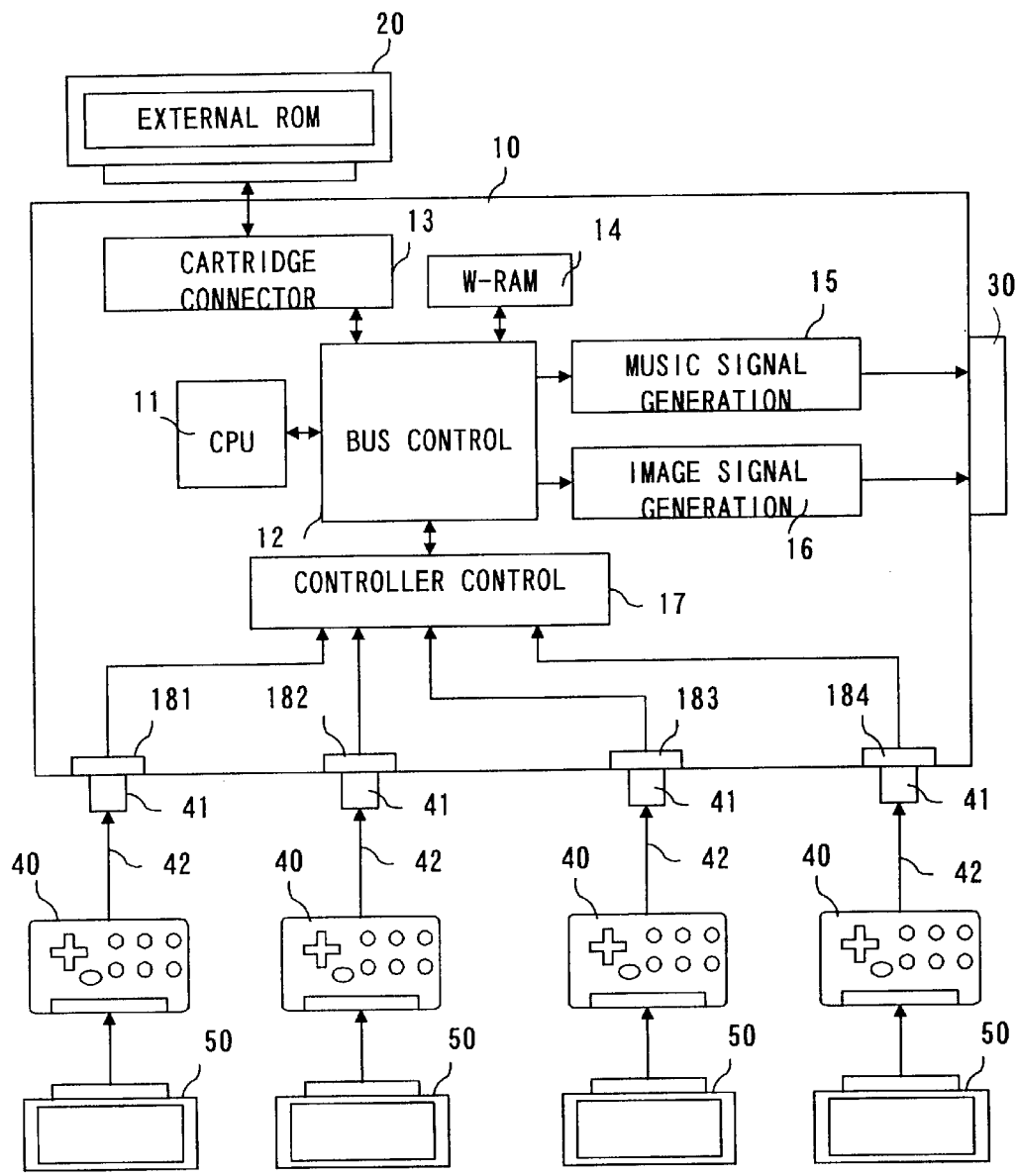
FIG. 2 is a block diagram showing in detail an image processing apparatus in the FIG. 1 embodiment.

FIG. 2 is a block diagram of the image processing system of this example. The image processing apparatus 10 incorporates therein a central processor unit (hereinafter "CPU") 11 and a bus control circuit 12. The bus control circuit 12 is connected with a cartridge connector 13 for detachably attaching the ROM cartridge 20, as well as a working RAM 14. The bus control circuit 12 is connected with an audio signal generating circuit 15 for outputting an audio signal processed by the CPU 11 and a video signal generating circuit 16 for outputting a video signal, and further with a controller control circuit 17 for serially transferring operating data of one or a plurality of controller(s) 40 and/or data of RAM cartridge(s) 50. The controller control circuit 17 is connected with controller connectors (hereinafter abbreviated as "connectors") 181–184 which are to be provided at a front face of the image processing apparatus 10. To the connector 18 is detachably connected a connection jack 41 and the controller 40 through a cable 42. Thus, the connection of the controller to the connector 181–184 places the controller 40 into electric connection to the image processing apparatus 10, enabling transmission and reception of data therebetween.

More specifically, the bus control circuit 12 inputs therein a command outputted by a parallel signal from the CPU 11 via a bus to parallel-serial convert it for outputting a command by a serial signal to the controller control circuit 17, and converts serial signal data inputted from the controller control circuit 17 into a parallel signal for outputting it to a bus. The data outputted through the bus is subjected to processing by the CPU 11, stored in W-RAM 14, and so on. In other words, the W-RAM 14 is a memory temporary storing the data to be processed by the CPU 11, wherein read-out and write-in of data is possible through the bus control circuit 12.

Figure 3:
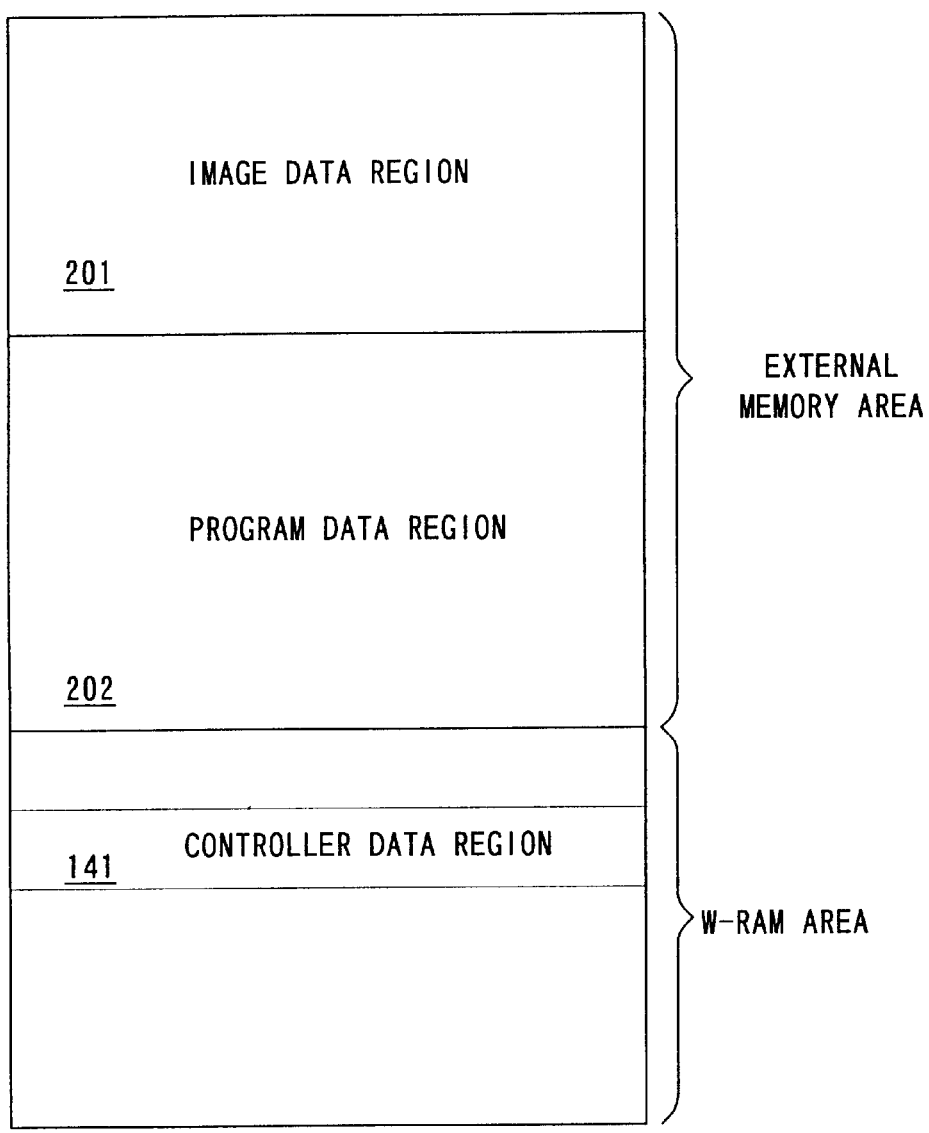
FIG. 3 is an illustrative view showing a memory map in CPU of FIG. 2 embodiment, demonstrating an external memory and a W-RAM incorporated in a cartridge.

FIG. 3 is a diagrammatic illustration showing memory regions assigned to respective memory spaces. The memory spaces accessible by the CPU via the bus control circuit 12 involves an external memory region of the ROM cartridge 20 and a memory region of the W-RAM 14. Although the ROM cartridge 20 is structured by mounting on a board a ROM stored with data for game processing and accommodating the same board in a housing, the ROM storage data is shown by the external memory region shown in FIG. 3. That is, the ROM includes an image data region 201 stored with image data required to cause the image processing apparatus 10 to generate image signals for the game, and a program data region 202 stored with program data required for predetermined operation of the CPU 11. In the program data region 202, there fixedly stored are an image display program for performing image display based on image data 201, a time-measuring program for carrying out measurement of time, and a determination program for determining that the cartridge 20 and an extension device 50, hereinafter referred to, are in a predetermined relationship. Incidentally, the details of the time-measuring program and the determination programs will be stated later. On the other hand, the memory region of W-RAM 14 includes a region 141 for temporarily storing data representative of an operating state from a control panel.

Figure 4:
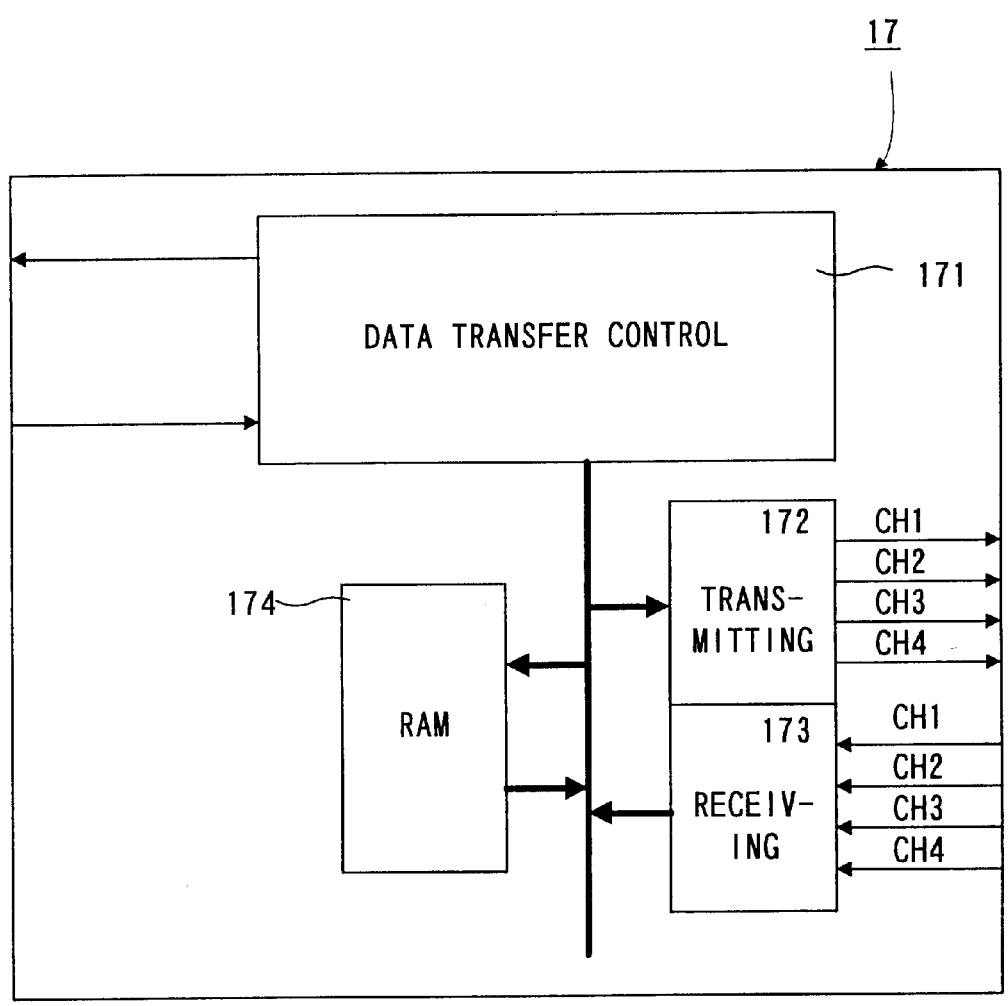
FIG. 4 is a block diagram showing in detail a controller control circuit in FIG. 2 embodiment.

FIG. 4 is a detailed circuit diagram of a controller control circuit 17. The controller control circuit 17 is provided for transmission and reception of data in serial between the bus control circuit 12 and the controller connector 181–184, and includes a data transfer control circuit 171, a signal transmitting circuit 172, a signal receiving circuit 173 and a RAM 174 for temporarily storing transmission and reception data. The data transfer control circuit 171 includes a parallel-serial conversion circuit and a serial-parallel conversion circuit for conversion of data format during data transfer, which also performs control of write-in and read-out of the RAM 174. The serial-parallel conversion circuit converts serial data supplied from the bus control circuit 12 into parallel data to provide it to the RAM 174 or the signal transmitting circuit 172. The parallel-serial conversion circuit converts parallel data supplied from the RAM 174 or the signal receiving circuit 173 into serial data to provide it to the bus control circuit 12. The signal transmission circuit 172 converts data for signal read-in control of the controller 40 supplied from the data transfer control circuit 171 and write-in data (parallel data) to the RAM cartridge 50 into serial data, which data is transmitted through a corresponding channel CH1–CH4 to each of the plurality of controllers 40. The signal receiving circuit 173 receives in serial read-out data, representative of an operating state of each of the controller 40, inputted through a corresponding channel CH1–CH4 to each of the controller 40 as well as read-out data from the RAM cartridge 50, to convert them into parallel data to provide it to the data transfer control circuit 171.

Figure 5:
FIG. 5 is an illustrative view showing a modulating/demodulating method for data.
Figure 5:
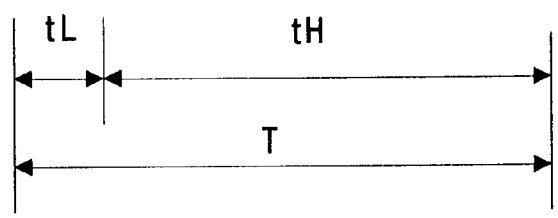
Figure 5:
Figure 5:
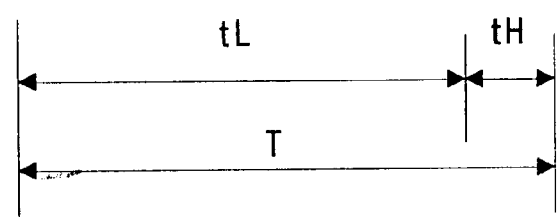

The signal transmitting circuit 172 and the signal receiving circuit 173 adopt a duty-cycle modulation and demodulation (hereinafter referred to as "modulation/demodulation") method as one example of the modulation/demodulation method. The duty-cycle modulation/demodulation method, as shown in FIG. 5, is a modulation/demodulation method wherein "1" and "0" are represented by varying a Hi time period and a Lo time period for a signal at a certain interval. Explaining the modulation/demodulation method with more detail, when data to be transmitted in serial is a logical "1" a signal having, within one cycle period T, a high-level period tH rendered longer than a low-level period tL (tH>tL) is transmitted, while when data to be transmitted is a logical "0" a signal having, within one cycle period T, tH rendered shorter than tL (tH<tL) is transmitted.

In the meanwhile, the demodulation method makes sampling on a serial signal received (bit transmission signal) so as to monitor at all times whether the received signal is at a high level or a low level, wherein one cycle is expressed as T=tL+tH provided that time period of low till change to high is tL and time period of high till change to low is tH. In this case, the relation of tL and tH being tL<tH is recognized as logical "1", while tL>tH is recognized as logical "0", thereby achieving demodulation. If the duty-cycle modulation/demodulation method like this is employed, there is no necessity of transmitting data in synchronism with clock, offering an advantage that transmission and reception of data are available with only one signal line. Incidentally, it is natural that if two signal lines are available another modulation/demodulation method may be utilized.

Figure 6:
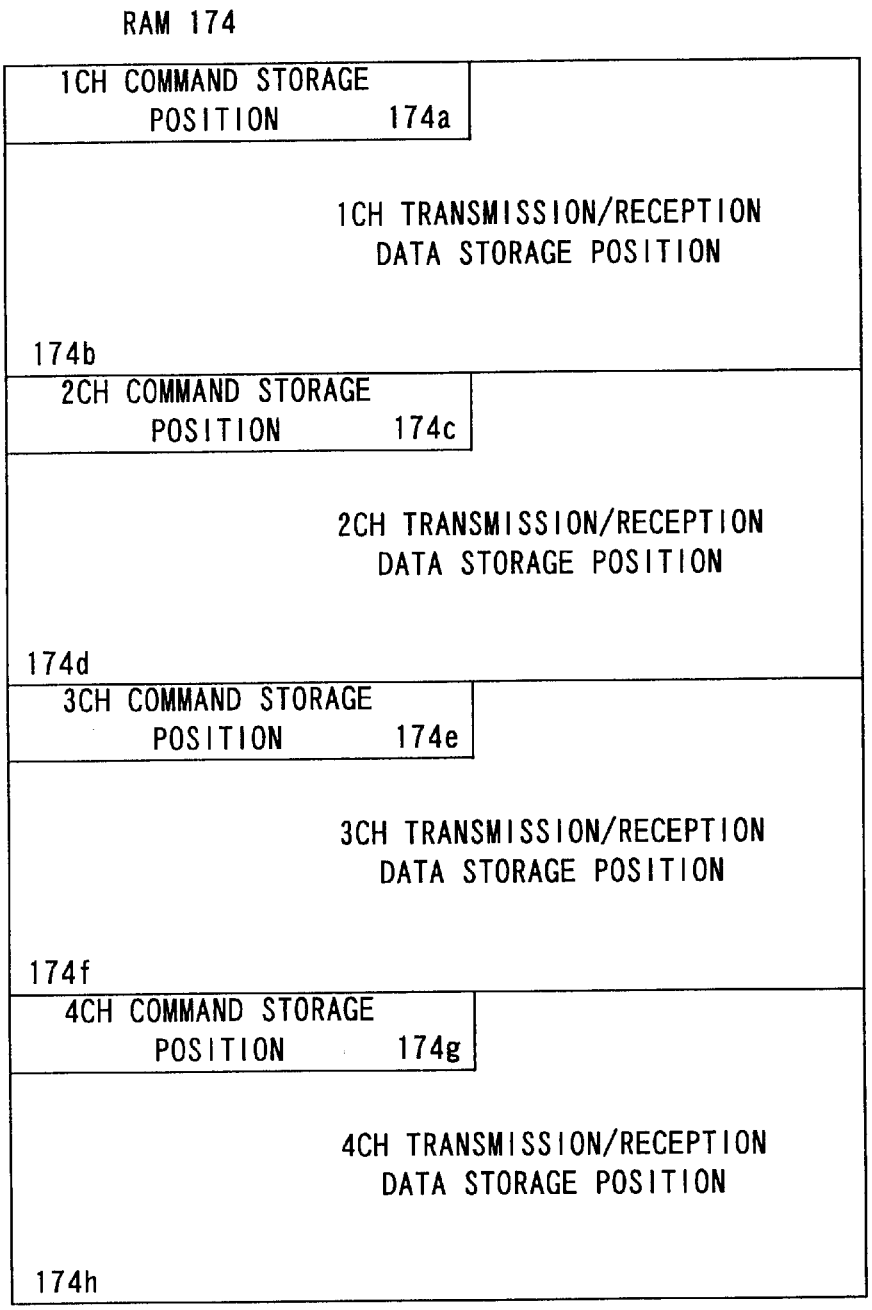
FIG. 6 is an illustrative view showing a memory map of a RAM in FIG. 4.

The RAM 174 includes memory regions or memory areas 174a–174h as shown in a memory map of FIG. 6. Specifically, the area 174a is stored with a command for channel 1, while the area 174b is stored with transmission data and reception data for channel 1. The area 174c is stored with a command for channel 2, while the area 174d is stored with transmission data and reception data for channel 2. The area 174e is stored with a command for channel 3, while the area 174f is stored with transmission data and reception data for channel 3. The area 174g is stored with a command for channel 4, while the area 174h is stored with transmission data and reception data for channel 4.

Accordingly, the data transfer control circuit 171 operates to write-in control to the RAM 174 data transferred from the bus control circuit 12 or data of operating state of the controller 40 received by the signal receiving circuit 173 or read-out data from the RAM cartridge 50, and read data out of the RAM 174 based on a command from the bus control circuit 12 to transfer it to the bus control circuit 12.

Figure 7:
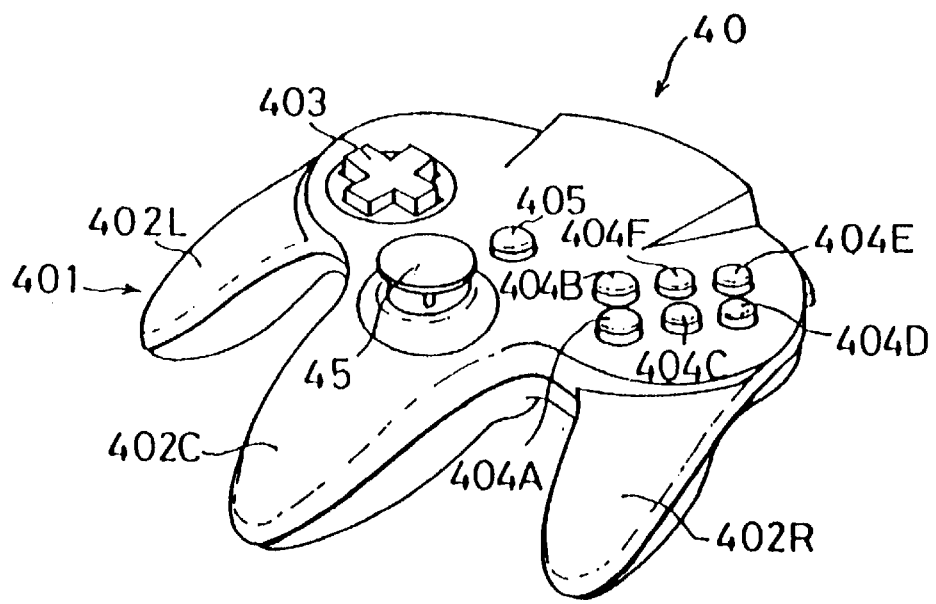
FIG. 7 is a perspective view of a controller of FIG. 2 embodiment as viewed from the above.
Figure 8:
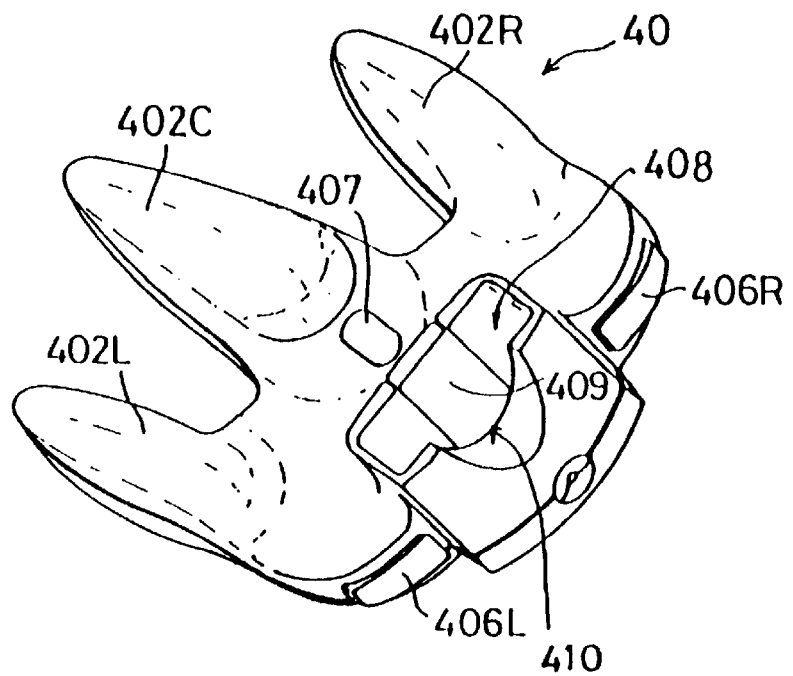
FIG. 8 is a perspective view of the controller of FIG. 2 embodiment as viewed from the bottom.

With referring to FIG. 7 and FIG. 8, the controller 40 of this embodiment shown includes a housing 401 consist of an upper half and a lower half. At both left and right ends of the housing 401, a left grip 402L and a right grip 402R are respectively formed in a manner that the same are protruded toward a front side. An intermediate position between the left grip 402L and the right grip 402R, a center grip 402C is formed in a manner that the same is protruded toward the front side. A cross-direction designation switch 403 which is a digital joystick is formed on a surface of the housing 401 in the vicinity of a base end of the left grip 402L. Action designation switches 404A, 40B, 404C, 404D, 404E and 404F which designate six (6) kinds of actions are respectively formed on the surface of the housing 401 in the vicinity of a base end of the right grip 402R.

An analog joystick 45 which is capable of designating all directions within 360 degrees is formed on the housing 401 in the vicinity of a base end of the center grip 402C. At an approximately central position of the housing 401, a start switch 405 which designates a start of a game is formed. Furthermore, the start switch 405 is positioned at an approximately center of an area surrounded by the switches 403 and 404A to 404F, and the analog joystick 45.

Furthermore, a pair of side surface switches 406L and 406R are formed on a rear surface of the housing 401, and a bottom surface switch 407 is formed at an approximately center of the lower half in the vicinity of the base end of the center grip 402C.

A rear surface of the lower half is extended toward direction of a bottom surface, and an opening portion 408 is formed at a tip end thereof. In an interior of the opening portion 408, a connector (not shown) to which an expansion cartridge 50 shown in FIG. 4 is connected is provided. Furthermore, a lever 409 for discharging the cartridge 50 inserted into the opening portion 408 is formed at a position of the opening portion 408. In addition, at a side opposite to the lever of the opening portion 408 to which the above described expansion cartridge 50 i s inserted, a notch 410 is formed, and the notch 410 secures a space for withdrawing the expansion cartridge 50 in discharging the expansion cartridge 50 with utilizing the lever 409.

Now, with referring to FIG. 9 to FIG. 13, the analog joystick 45 will be described in detail. The analog joystick 45 is constructed as a joystick unit shown in FIG. 9. The joystick unit is sandwiched by the upper half and the lower half of the housing 401. The joystick unit includes a housing formed by a case 451 and a cover 452, and an inner case 453 are accommodated within the housing.

Figure 10:
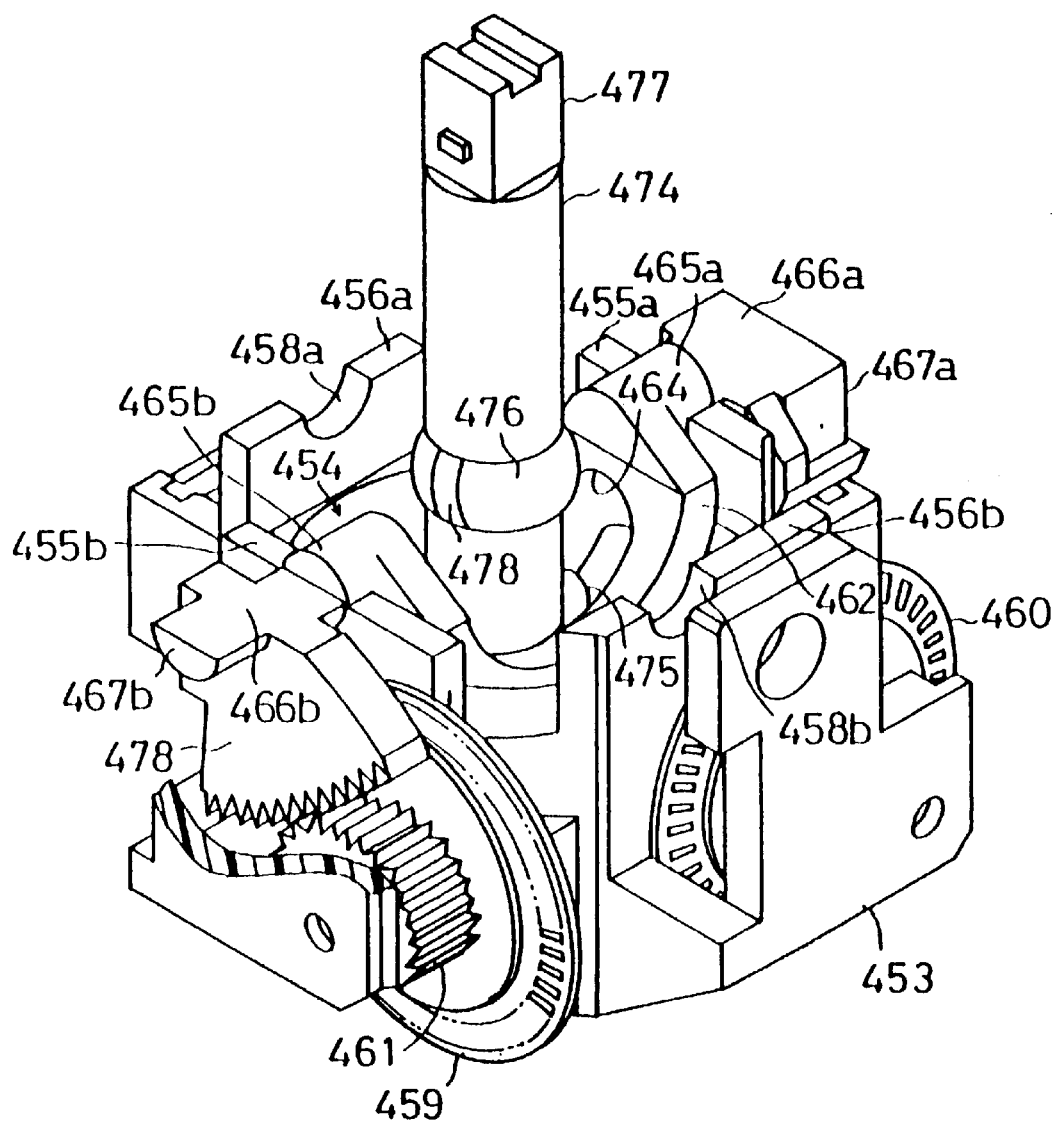
FIG. 10 is a perspective view showing major portions of FIG. 9 unit.
Figure 11:
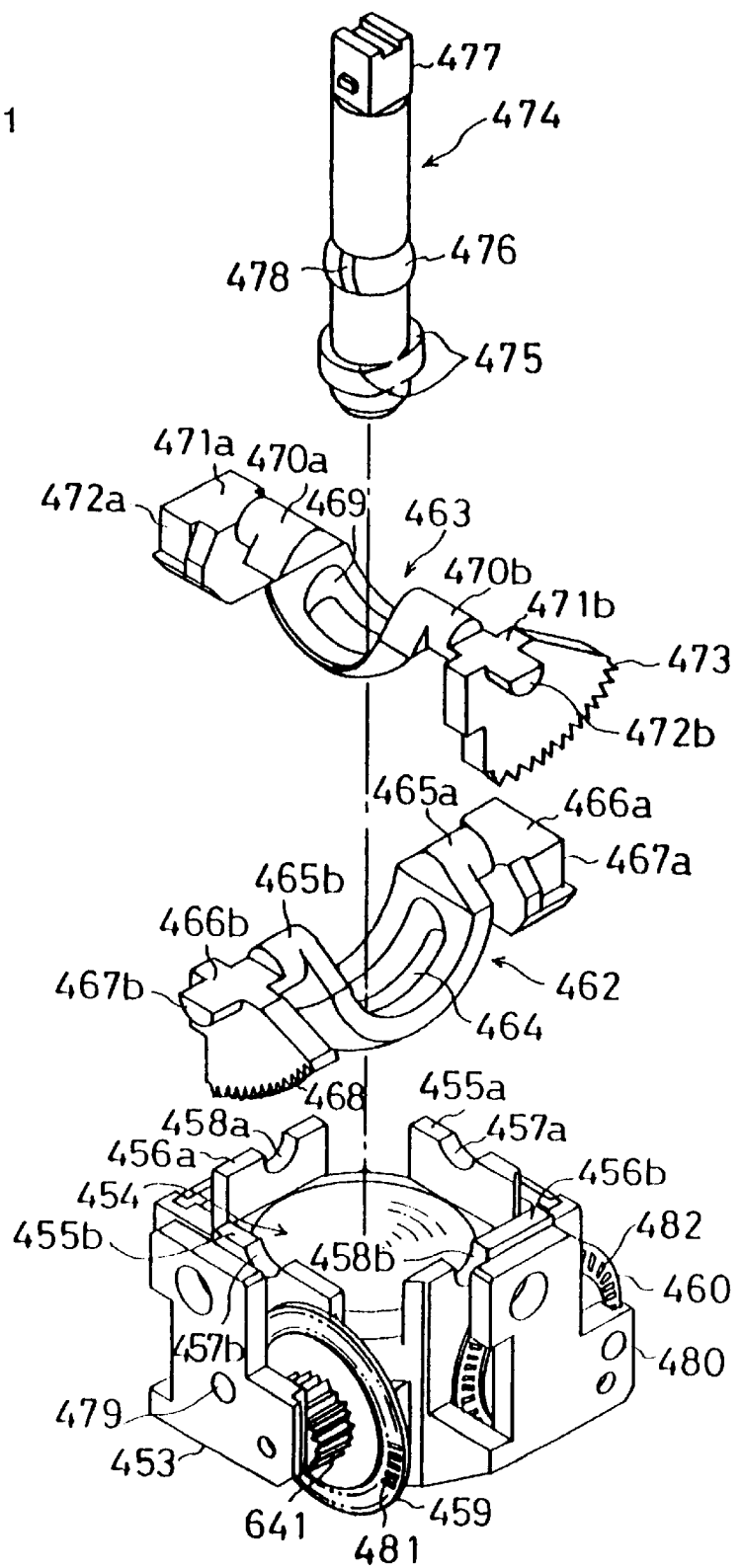
FIG. 11 is an exploded perspective view showing major portions of FIG. 9 unit

As shown in FIG. 10 and FIG. 11, the inner case 453 includes a bowl-shaped recess portion 454 formed at a center of the inner case 453, and there are provided with two pairs of support plates 455a and 455b, and 456a and 456b around the recess portion 454 with angle-interval of 90 degrees, and semicircular bearings 457a and 457b, and 458a and 458b are formed on the support plates 455a and 455b, and 456a and 456b, respectively. The bearings 457a and 457b or 458a and 458b are arranged on the same axis line, and axes of the bearings 457a and 457b, and 458a and 458b are at the same height level, and orthogonally intersected to each other. Wheels 459 and 460 having rotation shafts which are orthogonally intersected to each other are rotatably supported at a side surface of the inner case 453, and gears 461 are uniformly formed on the respective wheels 459 and 460.

The analog joystick unit further includes swingable members 462 and 463. One swingable member 462 is formed by an arc-like member which is provided with a long hole 464 be ing made long in a longitudinal direction of the arc-like member, an d supporting shafts 465a and 465b are formed at both ends of the swingable member 462, and shaft end portions 467a and 467b respectively having flat surfaces 466a and 466b are extended from the supporting shafts 465a and 465b, and a sector gear 468 is provided on one shaft end portion 467b. The other swingable member 463 is different from the one swingable member 462 in a point that the swingable member 463 is constructed by an arc-like member having a radius of curvature smaller than that of the swingable member 462; however, in other points, the swingable member 463 is constructed in a manner similar to or the same the swingable member 462. That is, a reference numeral 469 denotes a long hole, reference numerals 470a and 470b denote supporting shafts, reference numerals 471a and 471b denote flat surfaces, reference numerals 472a and 472b denote shaft end portions, and a reference numeral 473 denotes a sector gear.

The supporting shafts 465a and 465b, and 470a and 470b are individually inserted into the two sets of bearings 457a and 457b, and 458a and 458b of the inner case 453, and therefore, the part of the swingable members 462 and 463 can be supported in a swing-free fashion, and the swingable members 462 and 463 are arranged in a state where longitudinal directions of the long holes 464 and 469 are orthogonally intersected to each other and overlaid with an interval or gap. In the pair of swingable members 462 and 463 thus attached to the inner case 453, the sector gears 468 and 469 engage the above described gears 461. Furthermore, respective ones of the above described flat surfaces 466a and 466b, and 471a and 471b are included in the same horizontal plain in a neutral state of a lever 474 (described later).

As shown in FIG. 11, the lever 474 includes protrusions 475 which are protruded toward outer radius directions at one end of the lever 474, and a ball portion 476 at a middle portion of the lever 474, and a connection portion 477 at the other end of the lever 474. Grooves 478 which are extended in a latitude direction at positions apart from each other by 180 degrees are formed on the above described ball portion 476. A diameter of the lever 474 is selected at a size which is not larger than sizes of short directions of the long holes 464 and 469 formed on the swingable members 462 and 463. Preferably, the diameter of the lever 474 is selected at a size by which the lever 474 can be slidably inserted into the long holes 464 and 469 with no shake. Then, the one end portion of the lever 474 is penetrated through the long holes 464 and 469, and the protrusions 475 are fit into the long hole 464 of a lower side swingable member 462. Therefore, the protrusions 475 of the lever 474 protrude in a direction orthogonal to the longitudinal direction of the long hole 469 of an upper swingable member 463 being attached to the inner case 453, and therefore, if the lever 474 is pulled-up, the protrusions 475 are prevented from being slipped-off by the upper swingable member 463.

Figure 9:
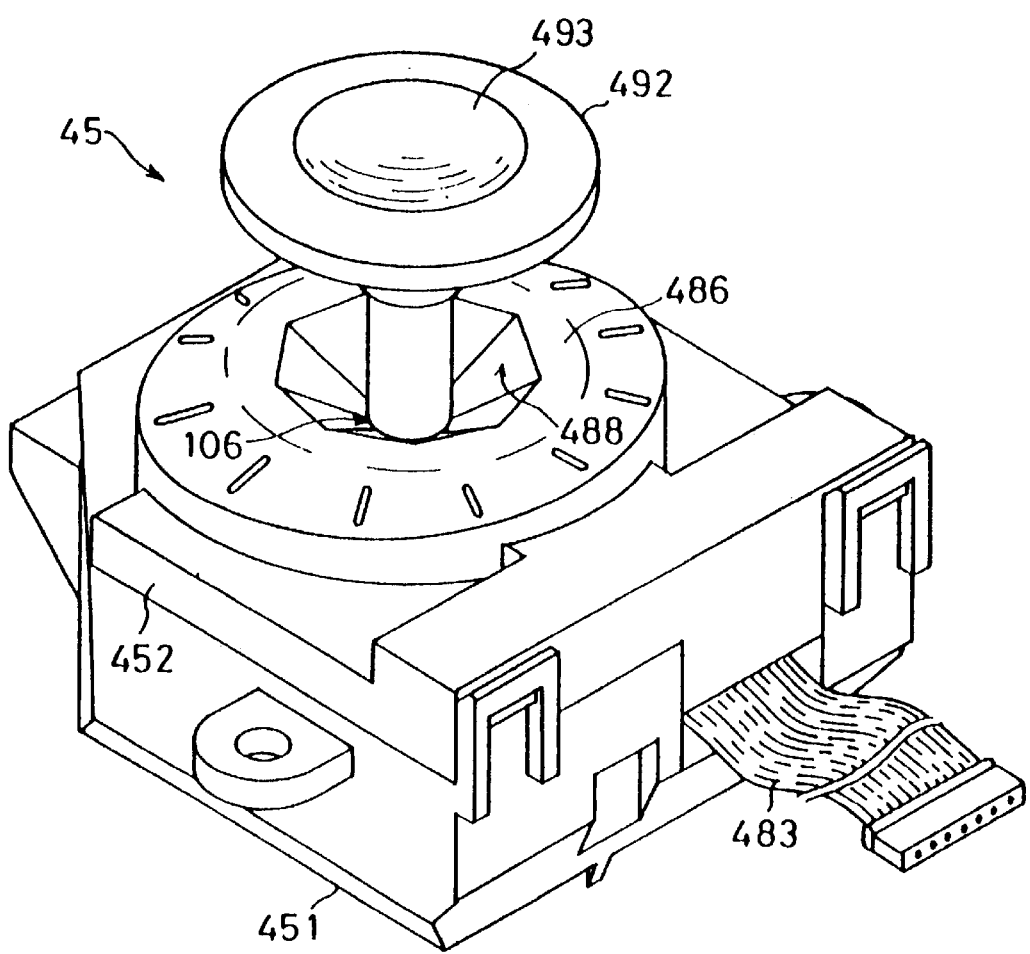
FIG. 9 is a perspective view of showing an analog joystick unit capable of being utilized in the embodiment.

A mechanical structural portion assembled as shown in FIG. 10 is accommodated within the outer case 451 shown in FIG. 9. At this time, the inner case 453 is fixed to the outer case 451 by a suitable means such as screws (not shown).

Then, as well seen from FIG. 11 there are provided on the inner case 453 photo-interrupters 479 and 480 which are opposite to the two wheels 459 and 460. The photo-interrupters 479 and 480 respectively include light-emitting elements and light-receiving elements (both not shown), and lights emitted by the light-emitting elements are received by the light-receiving elements through slits 481 and 482 respectively formed on the wheels 459 and 460. Therefore, the photo-interrupters 479 and 480 respectively detect the slits 481 and 482, and in response to the slits 481 and 482, outputs pulse signals according to rotations of the wheels 459 and 460.

In addition, the height level of swing-shafts (supporting shafts 465 and 470) of the swingable members 462 and 463 are coincident with a height level of a center of the ball portion 476 of the lever 474. Furthermore, a printed-circuit board (not shown) to which a flexible wiring plate 483 is connected is assembled in the outer case 451, and the light-emitting elements and the light-receiving elements included in the photo-interrupters 479 and 480 are electrically connected to printed patterns of the board.

Figure 12:
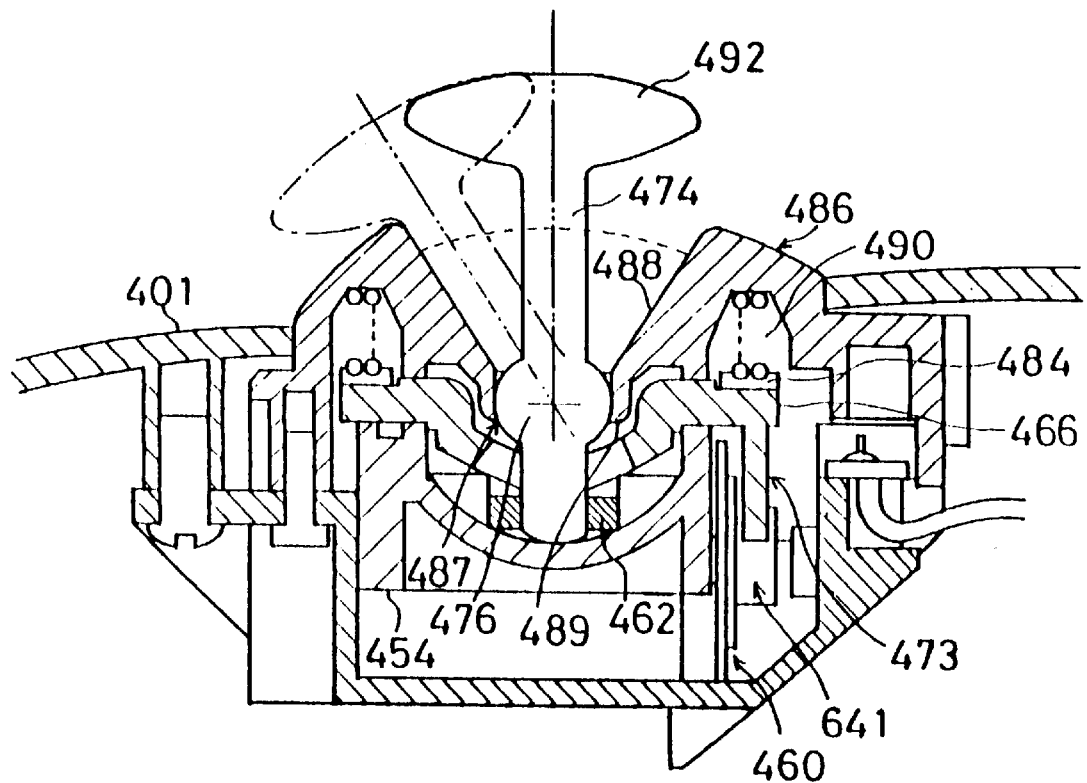
FIG. 12 is a sectional illustrative view showing major portions of FIG. 9 unit.

As shown in FIG. 12, a ring with groove 484 is supported above the flat surfaces 466 and 471 provided on the pair of swingable members 462 and 463, and a coil spring 485 is arranged above the ring with groove 484. The ring with groove 484 is one example of a pushing-down member, and in the neutral state of the lever 474, a lower surface of the ring 484 becomes horizontal, and the lower surface of the ring 484 and the above described flat surfaces 466 and 471 are brought into surface-contact with each other.

Figure 13:
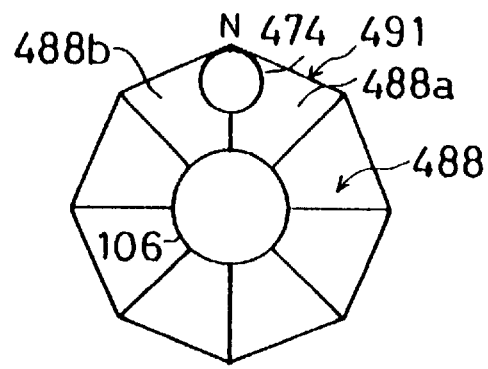
FIG. 13 is an illustrative view showing a state where a lever is guided by a guide ring.

As shown in FIG. 12, a guide ring 486 is attached to the cover 452, and a circular hole 487 is formed at a center portion of the guide ring 486. The guide ring 486 further includes a guide wall 488 which is a rising slope raised from an inner periphery defining the hole 487 toward an outer periphery of the guide ring 486. That is, the guide wall 488 is formed as a whole in "an earthenware mortar" or "cone"-shape. Then, in viewing the guide wall 488 from above, the guide wall 488 has an outer edge 491 which becomes octagonal as shown in FIG. 13.

In addition, a diameter of the hole 487 is selected to a size that is the same or approximately same as a diameter of an outer peripheral surface of the ball portion 476 of the above described lever 474. Therefore, as shown in FIG. 12, the inner edge defining the hole 487 is brought into contact with the ball portion 476 of the lever 474, and therefore, the lever 474 is supported by the ball portion 476 and the hole 487 in a manner that the lever 474 can be swung or inclined in any directions. Furthermore, circular bosses 489 are formed at two positions apart from each other by 180 degrees on the inner edge defining the hole 487 of the guide ring 486 in a manner that the bosses 489 are protruded toward an inner radius direction of the hole 487, and the bosses 489 individually fit into the grooves 478 formed in the latitude direction of the above described ball portion 476. Therefore, the lever 474 can be swung around an axis of the bosses 489, but the lever 474 can not be rotated around the axis of the lever 474 itself. Therefore, the lever 474 is prevented from being rotated around its axis by the grooves 478 of the ball portion 476 and the bosses 489.

Furthermore, if the cover 452 is attached to the case 451, a spring 490 is sandwiched and compressed between the ring with groove 484 and the cover 452. Therefore, the flat surfaces 466 and 471 of the pair of swingable members 462 and 463 are always depressed by a force of the spring 490 via the ring with groove 484, and by such a depressing operation, the pair of swingable members 462 and 463 are always elastically biased so that both members 462 and 463 are not inclined in any direction, and therefore, the lever 474 is in a vertical attitude. Therefore, the lever 474 is elastically biased into a neutral state.

The lever 474 is provided with an operating knob 492 which is attached to the lever 474 via the connection portion 477. On an upper surface of the operating knob 492, a recess portion 493 is formed such that a finger of the hand can be easily put on the knob 492.

In the above described analog joystick unit, according to an inclined direction and an inclined angle of the lever 474, the swingable members 462 and/or 463 are swung, and then, the wheels 459 and/or 460 are rotated in accordance with the inclined angle of the swingable members 462 and/or 463, and therefore, pulses according to rotation amounts of the wheels 459 and/or 460 are outputted, and the pulses are utilized as coordinate signals in X axis and/or Y axis directions.

Now, the guide ring 486 will be described in detail. As described above, the guide ring 486 includes the guide wall 488 having the octagonal outer edge 491 in viewing the guide ring 486 from above as shown in FIG. 13. Respective corners of the octagonal outer edge 491 function as recess portions which receive the lever 474 as shown in FIG. 13. Therefore, in this embodiment shown, the respective corners are positioned at eight positions with intervals of 45 degrees of upper (North), lower (South), left (West), right (East), a center position between upper and left (North-West), a center position between upper and right (North-East), a center position between lower and left (South-West) and a center position between lower and right (South-East). As to a point N indicative of upper (North) shown in FIG. 13, interfacing guide walls 488a and 488b converge at the point N. Therefore, if the lever 474 is inclined toward the point N, the lever 474 is moved along with the guide walls 488a and 488b sandwiching the point N, that is, the lever 474 is guided by the guide walls 488a and 488b, and finally, positioned at the point N. Therefore, at a time that the movable character (not shown) on the monitor (not shown) is intended to be moved upward, for example, the lever 474 may be inclined toward the point N. That is, when the movable character is to be advanced straight up and the lever 474 is inclined toward a vicinity of the point N, the lever 474 is restricted at the point N guide the guide walls 488a and 488b adjacent to the point N. By holding such a state, it is possible to surely advance the movable character straight-on.

Furthermore, in one example a method for detecting rotations of the wheels 459 and 460 one the slits 481 and 482 are detected by the photo-interrupters 479 and 480 described; however, another method may be utilized. For example, a plurality of conductive members may be formed on each of the wheels 459 and 460, and by electrically detecting the conductive members, a rotation of each of the wheels 459 and 460 can be detected.

Figure 14:
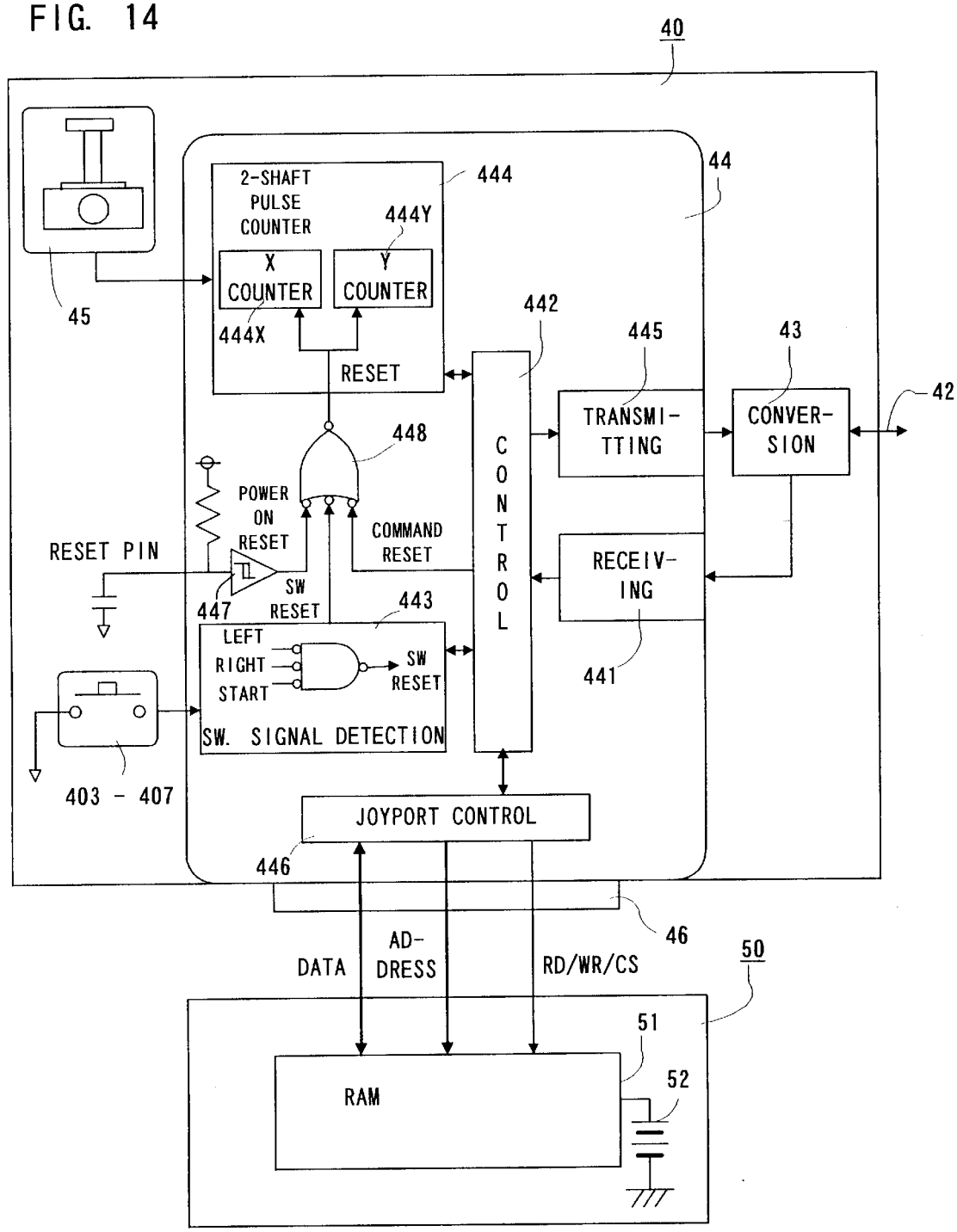
FIG. 14 is a block diagram showing in detail the controller and an expansion device.

FIG. 14 is a detailed circuit diagram of a controller 40 and a RAM cartridge 50 as one example of an extension device. The controller 40 incorporates within the housing electronic circuits such as operation signal processing circuit 44, etc. in order to detect operating states of the switches 403–407 or the joystick 45 or the like and transfer detected data to the controller control circuit 17. The operation signal processing circuit 44 includes a signal receiving circuit 441, a control circuit 442, a switch signal detecting circuit 443, a counter circuit 444, a signal transmitting circuit 445, a joyport control circuit 446, a reset circuit 447 and a NOR gate 448.

The signal receiving circuit 441 converts a serial signal, such as a control signal transmitted from the controller control circuit 17, write-in data to the RAM cartridge 50, etc., into a parallel signal to supply it to the control circuit 442. The control circuit 442 generates a reset signal to cause resetting (0) on measured values of an X-axis counter 444X and a Y-axis counter 444Y included in the counter 444, when the control signal transmitted from the controller control circuit 17 is a reset signal for an X, Y coordinate of the joystick 45. The joystick 45 includes photo-interrupters for X-axis and Y-axis so as to generate the number of pulses proportional to the amount of inclination of a lever in directions of X-axis and Y-axis, providing respective pulse signals to the counters 44X and 444Y. The counter 444X, when the joystick 45 is inclined in the X-axis direction, measures the number of pulses generated in proportion to the amount of inclination. The counter 444Y measures the number of pulses generated in proportion to the amount of inclination, when the joystick 45 is inclined in the Y-axis direction. Accordingly, the resultant vector, determined by the measured values in X-axis and Y-axis of the counter 444X and the 444Y, determines the direction of movement and the coordinate position for the heroic character or the cursor. Incidentally, the counter 444X and the counter 444Y are also reset by a reset signal supplied from the reset signal generating circuit 447 upon turning on the power supply, or a reset signal supplied from the switch signal detecting circuit 443 when the player depresses simultaneously two switches previously determined.

The switch signal detecting circuit 443 responds to an output command signal representing a switch state supplied at a constant period (e.g., at a 1/30-second interval as a frame period of a television), and reads a signal that is varied by the state of depression of the cross switch 403 and the switches 404A–404F, 405, 406L, 406R and 407 to supply it to the control circuit 442.

The control circuit 442 responds to a read-out command signal of operating sate data from the controller control circuit 17, and supplies the operating state data on the switches 403–407 and the measuring values of the counters 444X, 444Y to the signal transmitting circuit 445 in a predetermined data-format order. The signal transmitting circuit 445 converts these parallel signals outputted from the control circuit 442 into serial data to transfer them to the controller control circuit 17 via a conversion circuit 43 and a signal line 42.

To the control circuit 442 are connected an address bus, a data bus, and a port control circuit 446 through a port connector. The port control circuit 446 performs input-output control (or signal transmission or reception control) on data according to commands by the CPU 11, when the RAM cartridge 50, as one example of an extension device, is connected to a port connector 46. The RAM cartridge 50 includes a RAM 51 and a timer chip 53 as one example of a time-related information generating means (or a calendar timer) connected to the address bus and the data bus, a battery 52 connected thereto for supplying power to the RAM 51 and the timer counter 53, and a decoder 54 for activating the timer counter 53 when a predetermined address is given. The RAM 51 is a RAM that has a capacity lower than a half of a maximum memory capacity accessible by using an address bus, and comprises for example a 256 k-bit RAM. This avoids duplication between the write-in/read-out address of the RAM and the read-out address of the timer chip 53 by reading out a value of an arbitrary counter within the timer chip 53 when the highest order bit becomes "1". The RAM 51 stores backup data associated with a game, so that, if the RAM cartridge 50 is removed out of the port connector 46, the stored data is kept by receiving power supply from the battery 52. The details of the kind of data stored by the RAM 51, writing data therein, and utilization of the data stored will be described later.

FIG. 15 is a graphical illustration of a data format by which the image processing apparatus read out data representative of an operating state of switches 403–407 and joystick 45 from the controller 40. The data generated by the controller 40 is configured by 4-byte data. The first-byte data represents B, A, G, START, upper, lower, left and right, i.e., the depression of pressing points for upper, lower, left and right of the switch 404B, 404A, 407, 405 and the cross switch 403. For example, when the button B, i.e., the switch 404B, is depressed, the highest order bit of the first byte becomes "1". Similarly, the second-byte represents JSRST, 0 (not employed in the embodiment), L, R, E, D, C and F, i.e., the depression of the switch 409, 406L, 406R, 404E, 404D, 404C and 404F. The third byte represents by binary digit the X coordinate value (measured value by the X counter 444X) which value is in dependence upon inclination angle of the joystick 45 in the X direction. The fourth byte represents by binary digit the Y coordinate value (measured value by the Y counter 444Y) which value is in dependence upon inclination angle of the joystick 45 in the Y direction. Because the X and Y coordinate values are expressed by 8 bits of binary digit, the conversion of them into decimal digit makes possible representation of the inclination of the joystick 45 by a numeral of from 0–255. If the highest order bit is expressed by a signature denoting a negative value, the inclination angle of the joystick 45 can be expressed by a numeral between −128 and 127.

Referring to FIG. 16 to FIG. 19, explanations will be made on a format for the signal transmitted and received between the image processing apparatus 10 and the controller 40.

Figure 16:
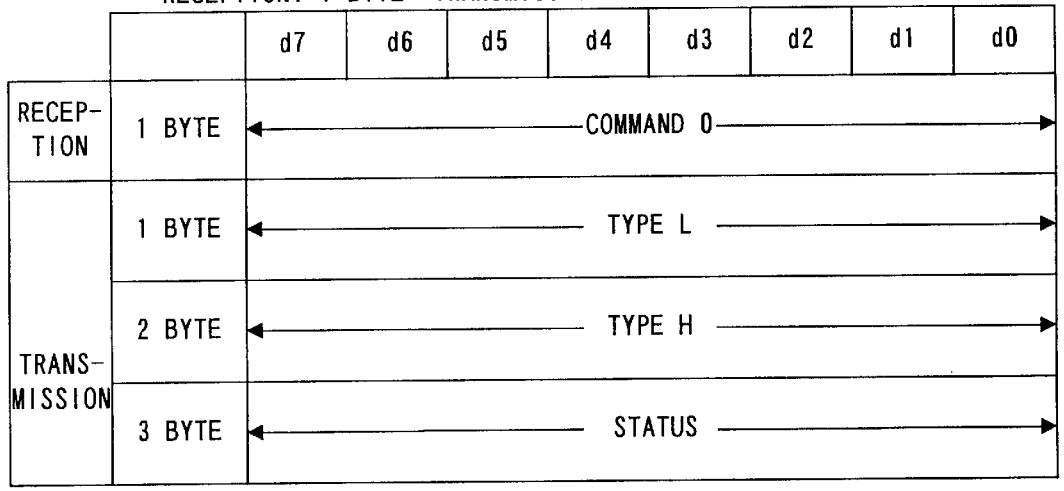
FIG. 16 is an illustrative view of transmission and reception data by the control circuit when a command "0" is transmitted from the controller control circuit.

FIG. 16 is an illustrative representation of a format for the signal transmitted and received between the image processing apparatus 10 and the controller 40 for identification of the type of a controller 40 by the image processing apparatus 10. The image processing apparatus 10 transmits a type data request signal of a command "0" configured by 1 byte (8 bits) to the control circuit 442 within the controller 40, and receives in response thereto a totally 3 bytes of a type data signal, concerning the controller 40, of TYPE L (1 byte), TYPE H (1 byte) and the status generated by the control circuit 442. Here, TYPE L and TYPE H are data representative of a function of a device or apparatus in connection to the connector 46. The respective data of TYPE L and TYPE H are data inherent to the type of a RAM cartridge 50. Based on the data, the image processing apparatus 10 identifies the type of a controller 40, i.e., the type of a RAM cartridge 50 being connected to the controller 40. The type of RAM cartridge 50 involves for example a type merely mounted with a RAM 51, a type mounted with a RAM 51 together with a timer chip, and a type mounted with a RAM 51 together with a liquid crystal display. In the present embodiment, the type mounted with a RAM 51 and a timer chip is being explained in detail. Meanwhile, the status data is data that represents whether or not the port is connected with an extension device such as a RAM cartridge 50 and whether or not an extension device has been connected thereto after resetting.

Figure 17:
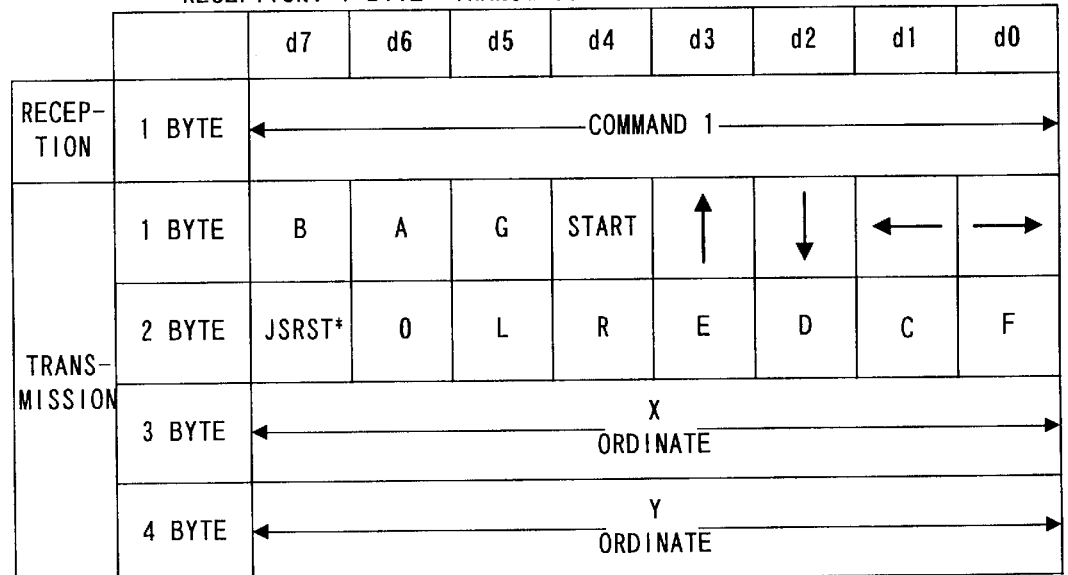
FIG. 17 is an illustrative view of transmission and reception data by the control circuit when a command "1" is transmitted from the controller control circuit.
Figure 18:
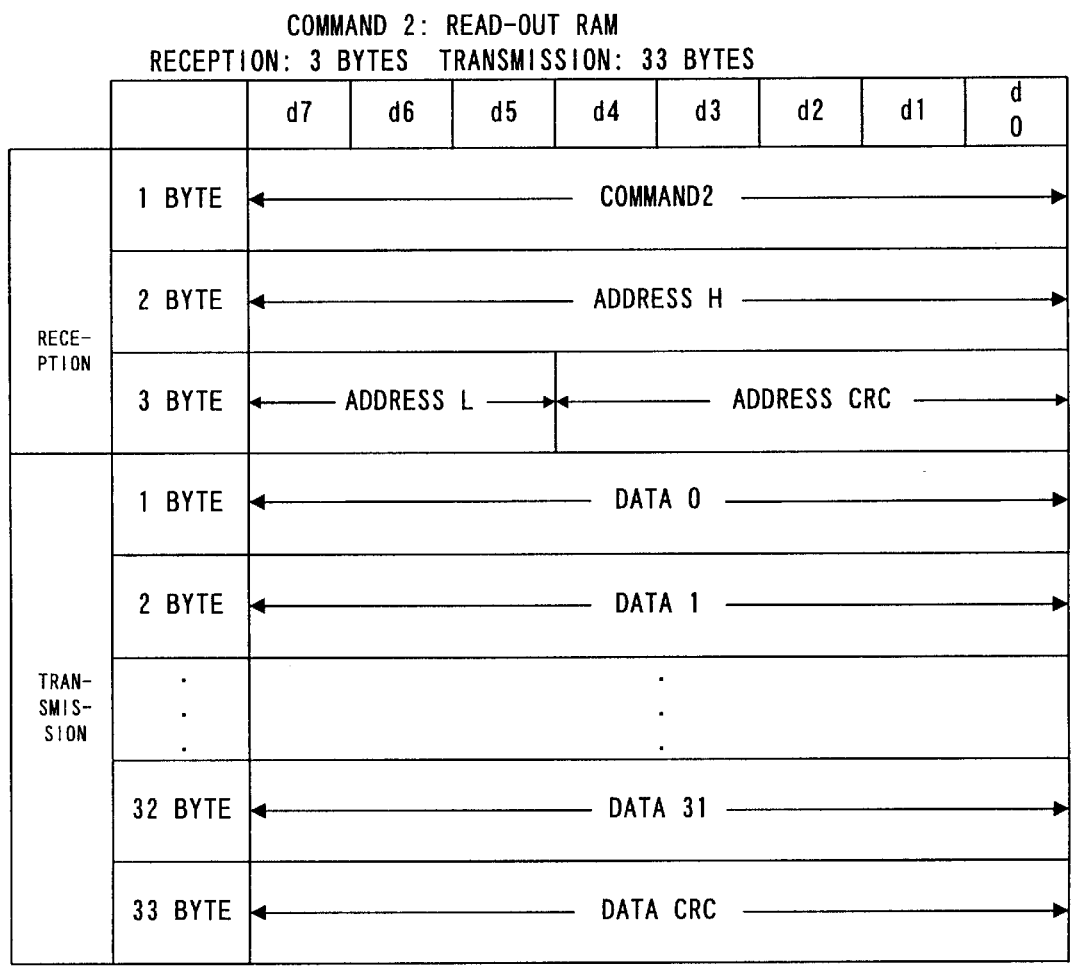
FIG. 18 is an illustrative view of transmission and reception data by the control circuit when a command "2" is transmitted from the controller control circuit.

FIG. 17 is an illustrative representation of a format for the signal transmitted and received between the image processing apparatus 10 and the controller 40 for discriminating the operating state of the controller 40 by the image processing apparatus 10. The image processing apparatus 10 transmits a controller data request signal of a command "1" configured by 1 byte (8 bits) to the control circuit 442 within the controller 40, and receives in response thereto an operating state data signal, concerning the controller 40, generated by the control circuit 442. Based on the operating state data, the image processing apparatus 10 acknowledges how the operator operates the controller 40 for utilization for varying the image. Incidentally, the operating state data signal has been stated in detail in the explanation on FIG. 10, and the explanation thereof is omitted here.

Figure 19:
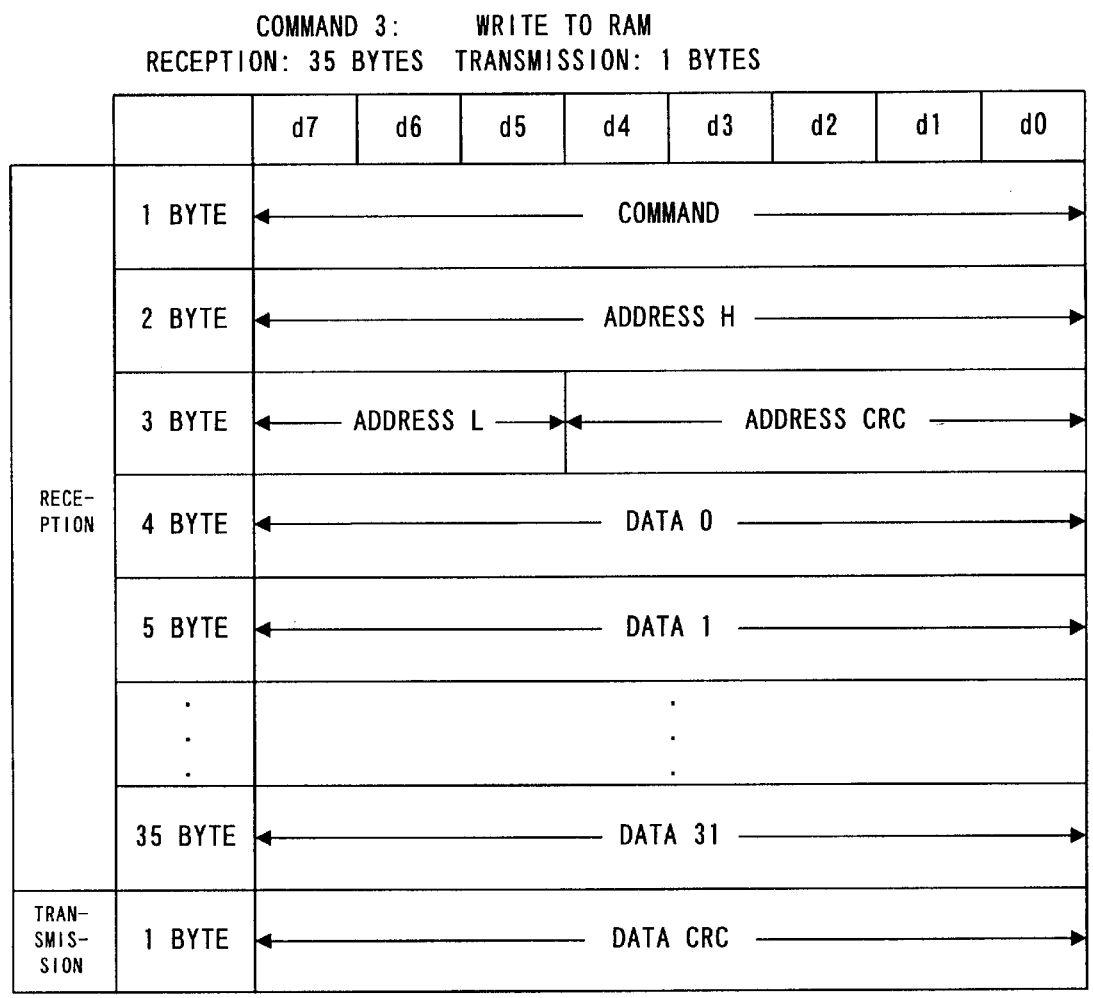
FIG. 19 is an illustrative view of transmission and reception data by the control circuit when a command "3" is transmitted from the controller control circuit.

FIG. 19 is an illustrative representation of a format for a read data signal when the image processing apparatus 10 reads data out of the RAM 51 within the RAM cartridge 50 being connected to the controller 40. The image processing apparatus 10 transmits, to the control circuit 442, a read command signal of a command "2" configured by 1 byte (8 bits), an address H (8 bits) signal representative of a higher order bit of an address, an address L (8 bits) signal representative of a lower order bit of an address and an address CRC (5 bits) signal for checking for transmission error of address data of the address H signal and address L signal. The image processing apparatus receives in response thereto a storage data signal, for the RAM 51, generated by the control circuit 442 and a data CRC (8 bits) signal for checking for data transmission error. Incidentally, to read out time-related information of the timer chip 53 by the image processing apparatus 10, it is satisfactory to read out addresses of 8000h or longer by merely rendering the address H signal value greater than 80h.

FIG. 19 is an illustrative representation of a format for a write data signal when the image processing apparatus 10 writes data into the RAM 51 within the RAM cartridge 50 being connected to the controller 40. The image processing apparatus 10 transmits, to the control circuit 442, a write command signal of a command "3" configured by 1 byte (8 bits), an address H (8 bits) signal representative of a higher order bit of an address, an address L signal and an address H signal representative of a lower order bit (3 bits) of an address, an address CRC (5 bits) signal for checking for transmission error of address data of the address L signal, and a 32-byte write-in data signal to be written into the RAM 51. The image processing apparatus 10 receives in response thereto a data CRC (8 bits) signal generated by the control circuit 442 for checking for data reception error. The image processing apparatus 10 receives the CRC signal to perform CRC checking with the transmitted write-in data, and judges based thereon that the data has correctly been written into the RAM 51. Incidentally, to reset for example date and time by writing time-related information into the timer chip from the image processing apparatus 10, it is satisfactory to perform writing into addresses of 8000h or longer by merely rendering the address H signal value greater than 80h.

The operation of data transmission and reception between the image processing apparatus 10 and the controller 40 will be explained.

Figure 20:
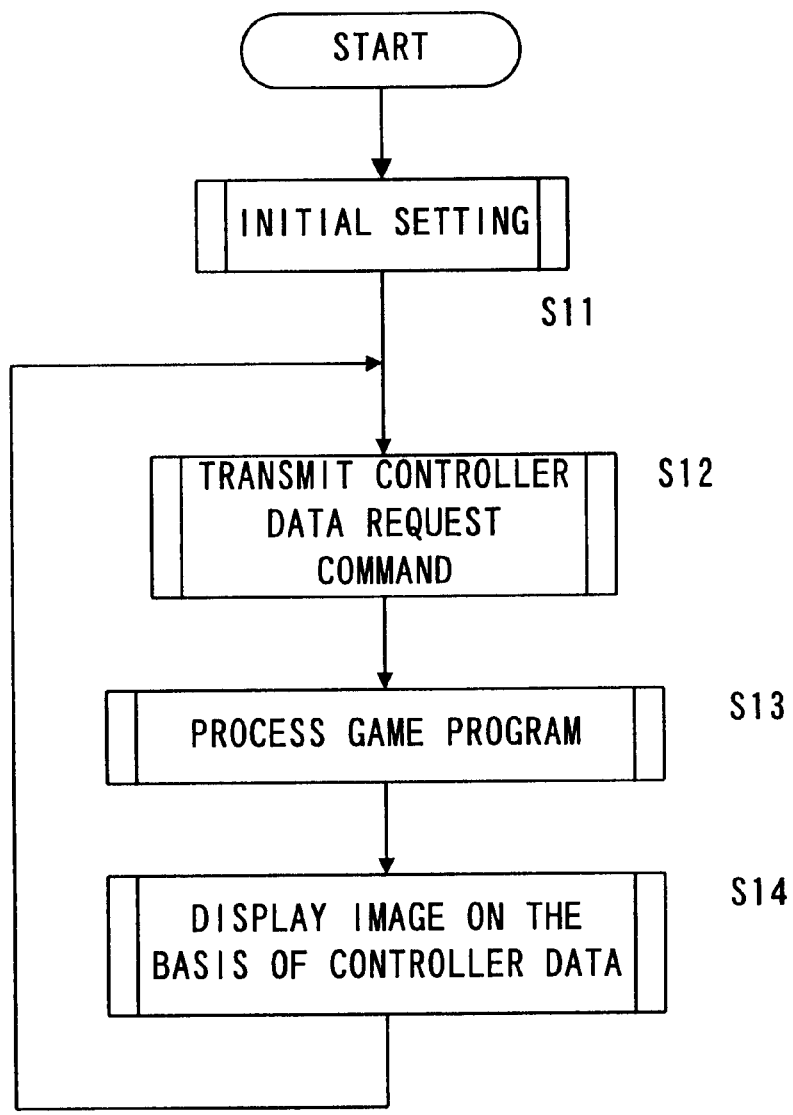
FIG. 20 is a flowchart showing operation of the CPU of FIG. 2 embodiment.

Referring first to a flowchart for the CPU of the image processing apparatus 10 in FIG. 20, explanations will be made on image processing. At a step S11, initial setting is made by the CPU 11 based on an initial value (not shown) stored in the program data area in FIG. 5. Then, at a step S12, the CPU 11 outputs a control pad data request command stored in the program data area 202 to the bus control circuit 12. At a step S13, the CPU 11 carries out a predetermined image processing based on the program stored in the program data area 202 and the image data area 201. While the CPU 11 is executing step S13, the bus control circuit 12 is under execution of steps S21–S24. Then, at a step S14, the CPU 11 outputs image data based on the control pad data stored in the control pad data area 141 in FIG. 3. After completing step S14, the CPU repeats to execute steps S12–S14.

Figure 21:
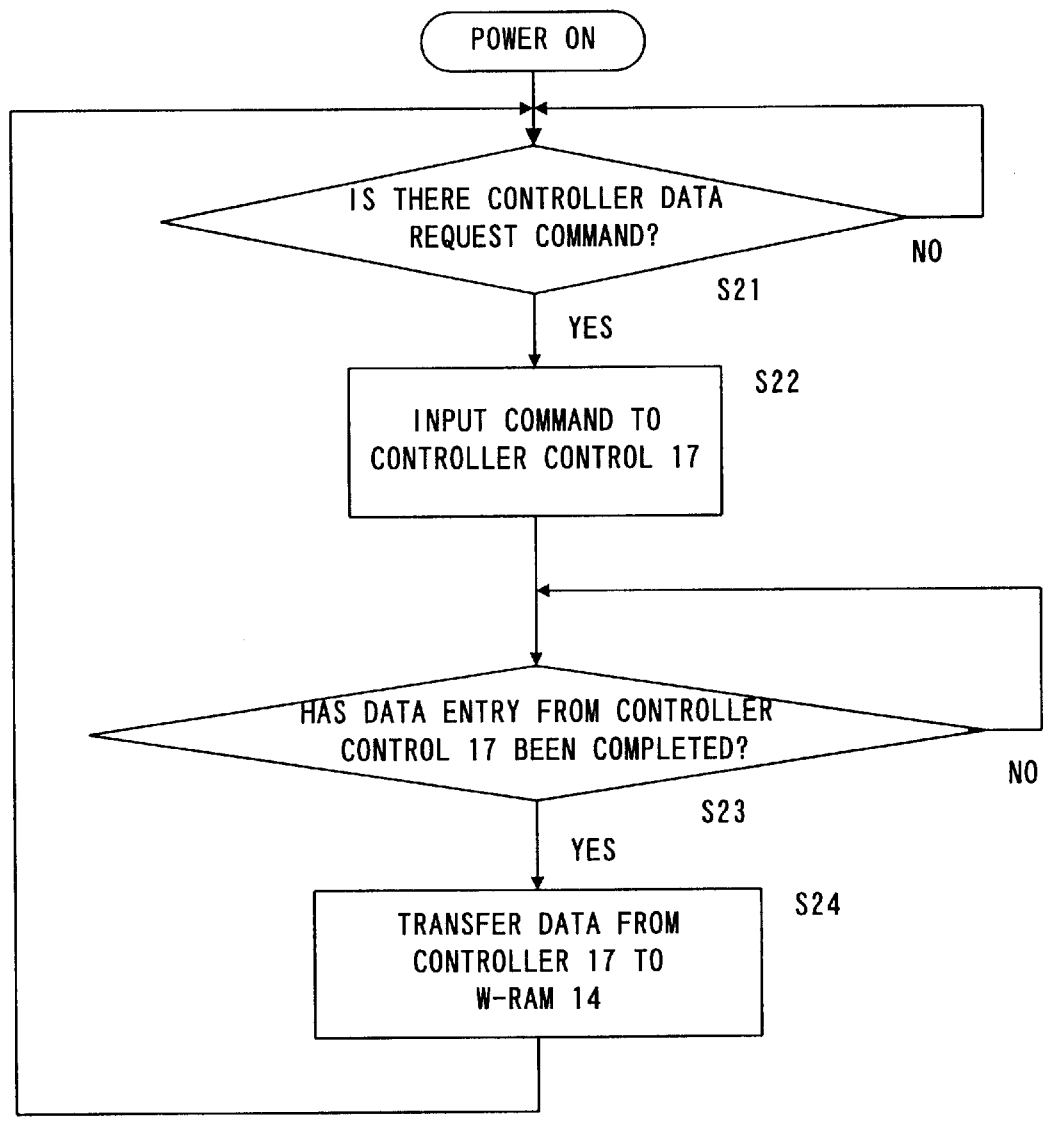
FIG. 21 is a flowchart showing operation of the bus control circuit of the FIG. 2 embodiment.

The operation of the bus control circuit 12 will be explained by using FIG. 21. At a step S21, the bus control circuit 12 determines whether or not the CPU 11 has outputted a controller data request command (a request command for data on switches of the controller 40 or data on the extension device 50). If no controller data request command has been outputted, it is waited for outputting. If a controller data request command has been outputted, the process proceeds to a step S22. At the step S22, the bus control circuit 12 outputs a command for reading in data of the controller 40 (command 1 or command 2 referred to later) to the controller control circuit 17. Then, at a step S23, the bus control circuit 12 determines whether or not the controller control circuit 17 has received data from the controller 40 to store it in the RAM 174. If the controller control circuit 17 has not received data from the controller 40 to store in the RAM 174, the bus control circuit 12 waits at the step S23, while if the controller control circuit 17 has received data from the controller 40 to store it in the RAM 174, the process proceeds to a step S24. At the step S24, the bus control circuit 12 transfers the data of the controller 40 stored in the RAM 174 to the W-RAM 14. The bus control circuit 12, when completing the data transfer to the W-RAM 14, returns the process back to the step S21 to repeat execution of the step S21–the step S24.

Figure 30:
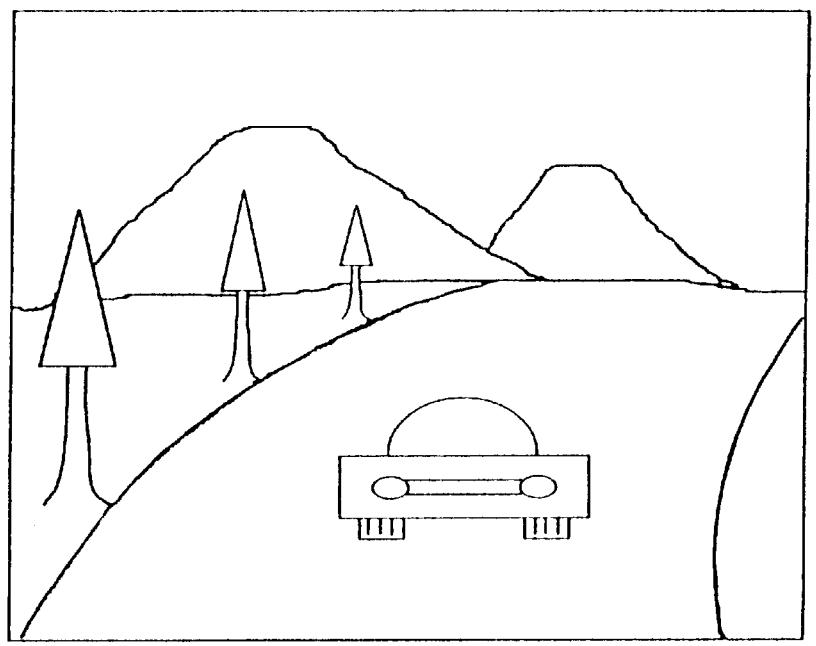
FIG. 30 is an illustrative view showing one example of an initial screen of a racing game.
Figure 31:
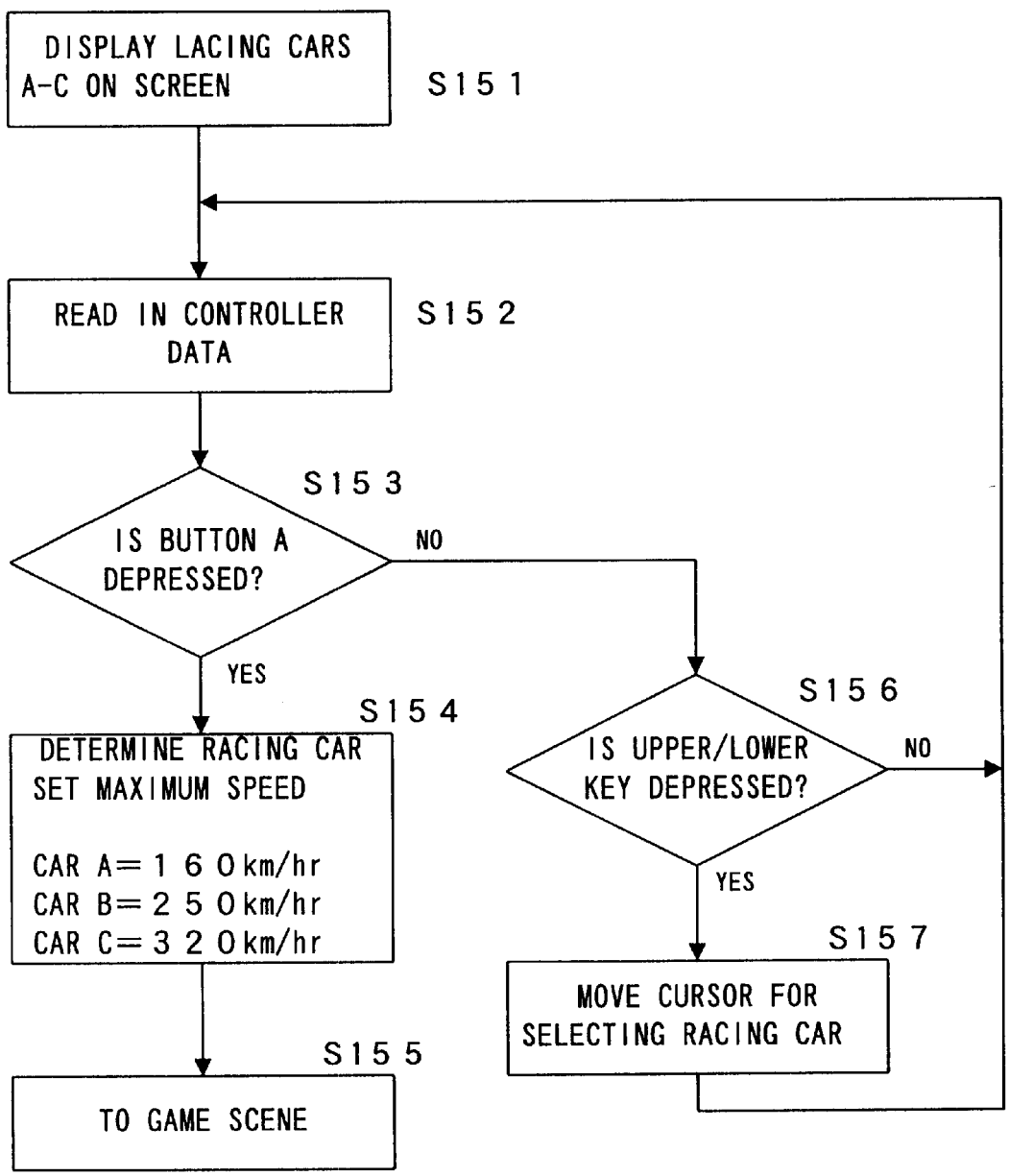
FIG. 31 is a flowchart showing the conventional operation for selecting a racing car.

The flowcharts of FIG. 30 and FIG. 31 illustrate the example wherein, after the bus control circuit 12 has trans-ferred data from the RAM 174 to the W-RAM 14, the CPU 11 processes the data stored in the W-RAM 14. However, the CPU 11 may directly process the data in the RAM 174 through the bus control circuit 12.

Figure 22:
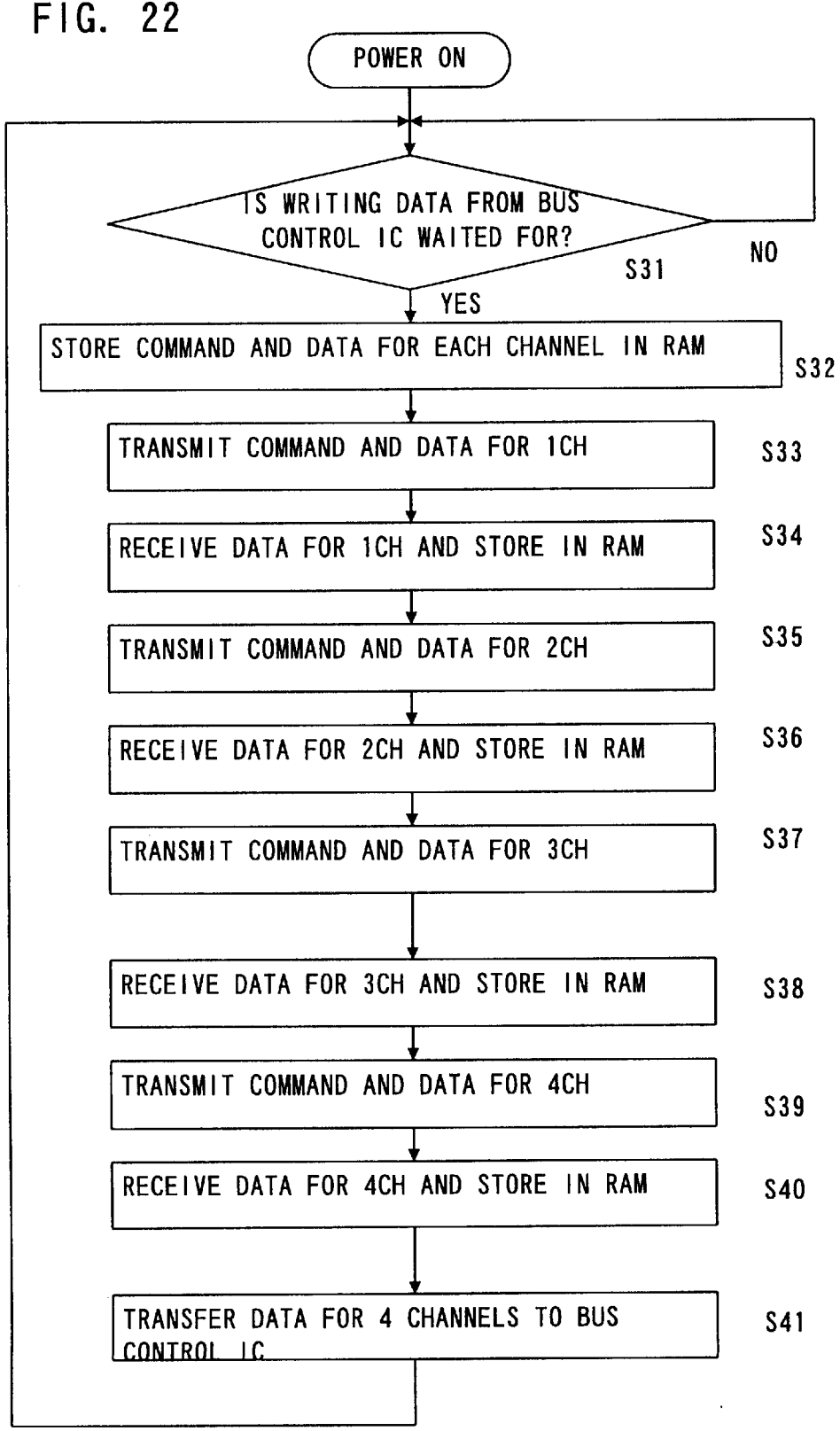
FIG. 22 is a flowchart showing operation of the controller control circuit of FIG. 2 embodiment.

FIG. 22 is a flowchart for explaining the operation of the controller control circuit 17. At a step S31, the presence or absence of waiting for write-in by the bus control circuit 12 is determined. If not waited for write-in, the data transfer control circuit 171 waits until there comes to waiting for write-in from the bus control circuit 12. If waiting for write-in, at a next step S32 the data transfer control circuit 171 causes the RAM 174 to store commands for the first to the fourth channels and/or data (hereinafter abbreviated as "command/data"). At a step S33, the command/data for the first channel is transmitted to the controller 40 being connected to the connector 181. The control circuit 442 performs a predetermined operation based on the command/data to output data to be transmitted to the image processing apparatus 10. The content of the data will be stated later in explaining the operation of the control circuit 442. At a step S34, the data transfer control circuit 171 receives data outputted from the control circuit 442, to cause the RAM to store the data.

From now on, at a step S35 the command/data for the second channel is transmitted to the controller 40, in a manner similar to the operation for the first channel at the steps S33 and S34. The control circuit 442 performs a predetermined operation based on this command/data to output the data to be transmitted to the image processing apparatus 10. At a step S36 are carried out the processes of data transfer and write-in for the second channel. Meanwhile, at a step S37, the command/data for the fourth channel is transmitted to the controller 40. The control circuit 442 performs a predetermined operation based on this command/data to output the data to be transmitted to the image processing apparatus 10. At a step S38 are carried out the processes of data transfer and write-in for the third channel. Furthermore, at a step S39, the command/data for the fourth channel is transmitted to the controller 40. The control circuit 442 of the controller 40 performs a predetermined operation based on this command/data to output the data to be transmitted to the image processing apparatus 10. At a step S40 are carried out the processes of data transfer and write-in for the fourth channel. At a subsequent step S41, the data transfer circuit 171 transfer in batch the data which have received at the steps S34, S36, S38 and S40 to the bus control circuit 12.

In the manner as stated above, the data for the first channel to the fourth channel, that is, the commands for the controllers 40 being connected to the connectors 181–184 and the operating state data to be read out of the controllers 40, are transferred by time-divisional processing between the data transfer control circuit 171 and the control circuit 442 respectively within the controllers 40.

Figure 23:
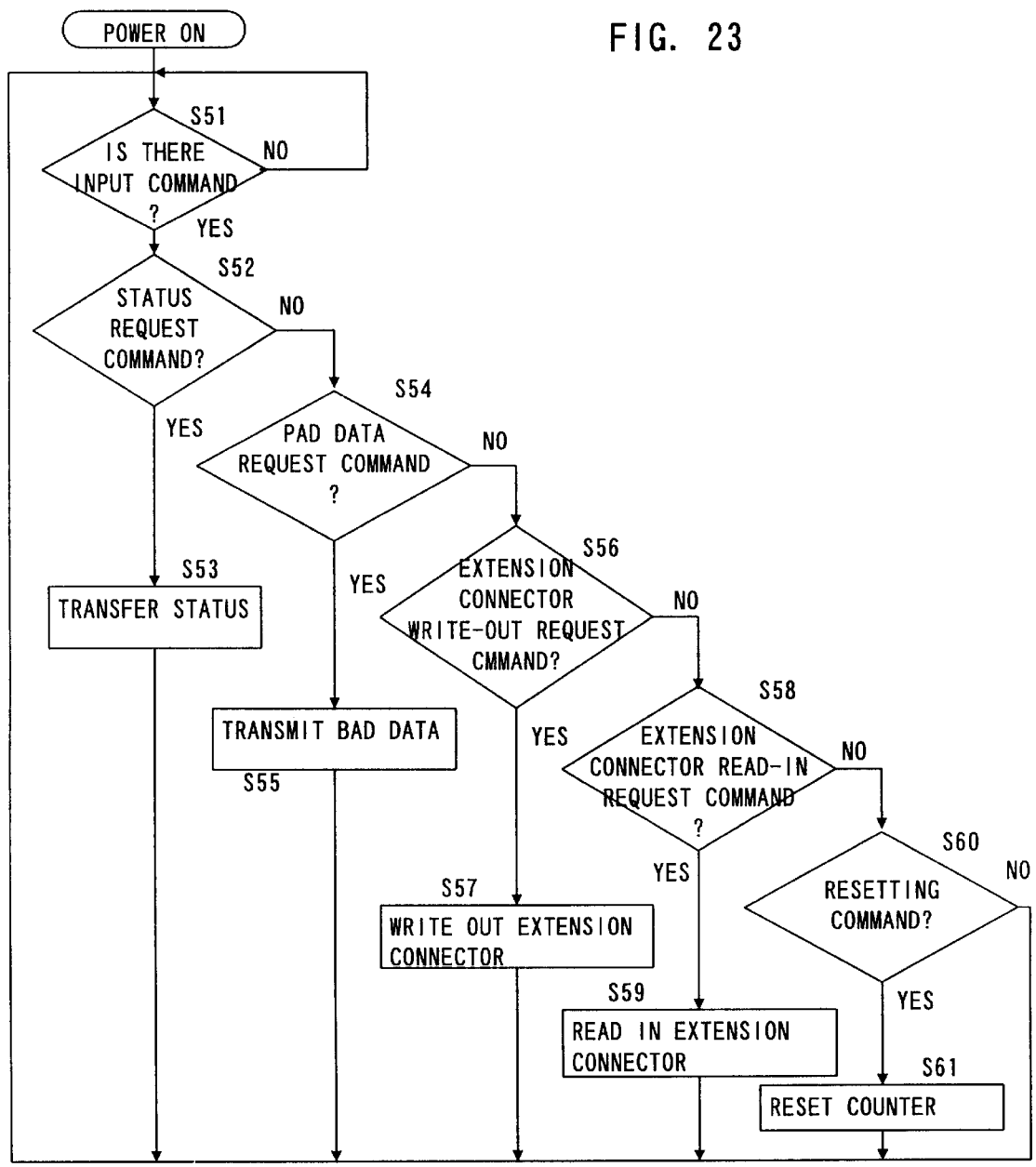
FIG. 23 is a flowchart showing operation of the controller circuit of FIG. 2 embodiment.

FIG. 23 is a flowchart for explaining the operation of the controller circuit 44. First, at a step S51, it is determined whether or not a command has been inputted from the image processing circuit 10 to the control circuit 442. If no command has been inputted, it is waited for inputting of a command. If a command is inputted, at a step S52 it is determined whether or not the command inputted to the control circuit 442 is a status request command (command "0"). If a command "0", the process proceeds to a step S53, wherein a status transmitting process is carried out.

At the step S53, where the CPU 11 outputs the command "0", the data in format as shown in FIG. 13 is transmitted and received between the image processing apparatus 10 and the controller 40. On this occasion, the control circuit 442, when receiving the command "0" data configured by 1 byte (8 bits), transmits TYPE L (1 byte), TYPE H (1 byte) and the status. Here, TYPE L and TYPE H are data for identifying the function of a device or apparatus being connected to the joyport connector 46, which are inherently recorded in the RAM cartridge 50. This makes possible recognition by the image processing apparatus 10 what extension device (e.g., a RAM cartridge 50 or other extension devices such as a liquid crystal display) is being connected to the controller 40. The status is data representative of whether or not an extension device such as a RAM cartridge 50 is being connected to the port and whether or not the connection of the extension device is after resetting.

On the other hand, at the step S52 if the determination is not a command "0", it is determined at a step S54 whether or not the inputted command is a pad-data request command (command "1"). If it is a command "1", the process proceeds to a step S55 where the process of transmitting pad data is performed. Specifically, where the CPU 11 outputs a command "1", the data in format as shown in FIG. 14 is transmitted and received between the image processing apparatus 10 and the controller 40. On this occasion, the control circuit 442, if receiving command "1" data configured by 1 byte (8 bits), transmits the data of 14 switches (16 bits) of B, A, G, START, upper, lower, left, right, L, R, E, D, C and F; the data of JSRST (1 bit); and the data of the counter 444X and the counter 444Y (16 bits). By transmitting these data to the image processing apparatus 10, the image processing apparatus 10 is recognized of how the operator operated the controller 40. Thus, these data are utilized for varying the image by the image processing apparatus 10 in accordance with the operating state of the controller 40.

At the aforesaid step S54, if the determination is not a command "1", it is determined at a subsequent step S56 whether or not the inputted command is a read-out request command (command "2") for data associated with the RAM cartridge 50 to be connected to the extension connector. Where the determination is a command "2", the process proceeds to a step S57 where the process of write-out of the extension connector is performed. Specifically, where the CPU 11 outputs a command "2", the data in format as shown in FIG. 15 is transmitted and received between the image processing apparatus 10 and the controller 40. On this occasion, when the control circuit 442 receives command "2" data configured by 1 byte (8 bits), address H representative of the higher-order bits (8 bits) of address, address L representative of the lower-order bits (3 bits) of address, and address CRC (5 bits) for checking for error in address data transmitted and received, the control circuit 442 transmits data stored in the RAM cartridge (32 bytes) and CRC (8 bits) for checking for data errors. In this manner, the connection of the RAM cartridge 50 (or other extension devices) and the image processing apparatus 10 enables the image processing apparatus 10 to process data from the RAM cartridge 50, etc.

At the aforesaid step S56, if the determination is not a command "2", it is determined at a subsequent step S58 whether or not the inputted command is a read-in request command (command "3") for information associated with the RAM cartridge 50 being connected to the extension connector 46. Where it is the command "3", the process of data read-out is carried out at a step 59 for the RAM cartridge 50 being connected to the extension connector 46. Specifically, if the CPU 11 outputs a command "3", the data shown in FIG. 3 is transmitted and received, in response to the command "3", between the image processing apparatus 10 and the controller 40.

That is, when the control circuit 442 receives command "3" data configured by 1 byte (8 bits), address H representative of the higher-order bits of address (8 bits), address L representative of the lower-order bits of address (3 bits), address CRC for checking for error in address data transmitted and received (5 bits), and data to be transmitted to the RAM cartridge 50 (32 bytes), it transmits CRC for checking for error for data received (8 bits). In this manner, the connection of the extension device 50 and the image processing apparatus 10 enables the image processing apparatus 10 to control the extension device 50. The connection of the extension device 50 and the image processing apparatus 10 also drastically improves the function of the controller 40.

If at the aforesaid step S58 the determination is not a command "3", it is determined at a step 60 whether or not it is a reset command (command 255). Where it is the reset command (255), the process of resetting the counter 444 for the joystick 45 is performed at a step S61.

Figure 24:
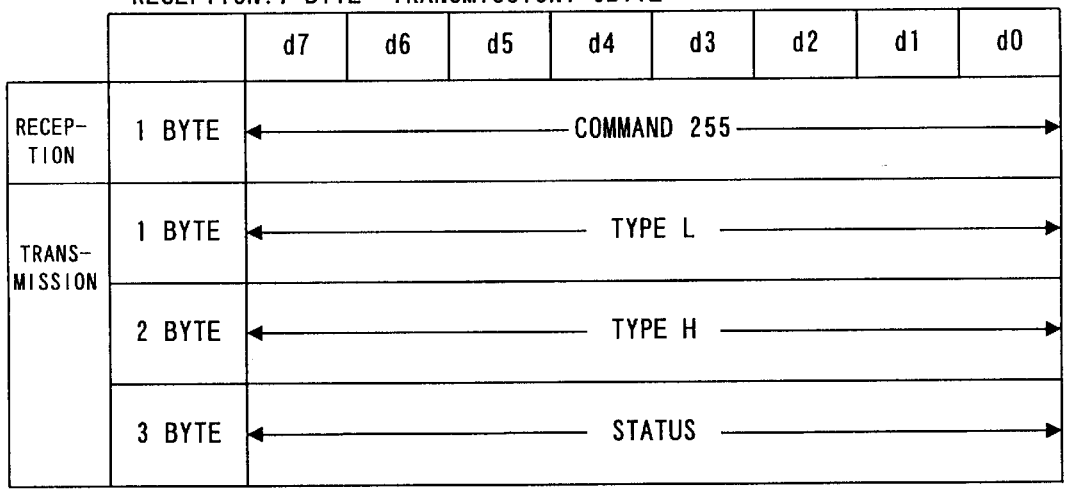
FIG. 24 is an illustrative view of transmission and reception data by the control circuit when a command "255" is transmitted from the controller control circuit.

Specifically, where the CPU 11 outputs a command 255, the data shown in FIG. 24 is transmitted and received between the image processing apparatus 10 and the controller 40. That is, the control circuit 442 of the controller 40, if receiving command 255 data configured by 1 byte (8 bits), outputs a reset signal to reset the X counter 444X and the counter 444Y, and transmits aforesaid TYPE L (1 byte), TYPE H (1 byte) and the status.

A detailed operation for resetting the joystick 45 will be described.

In order to reset of the joystick 45 to determine an origin point thereof, there are three methods, i.e., a method through an operation of the buttons, a method through turning-on/off the power source, and a method by the image processor 10.

(1) A reset operation by operating the buttons

Figure 25:
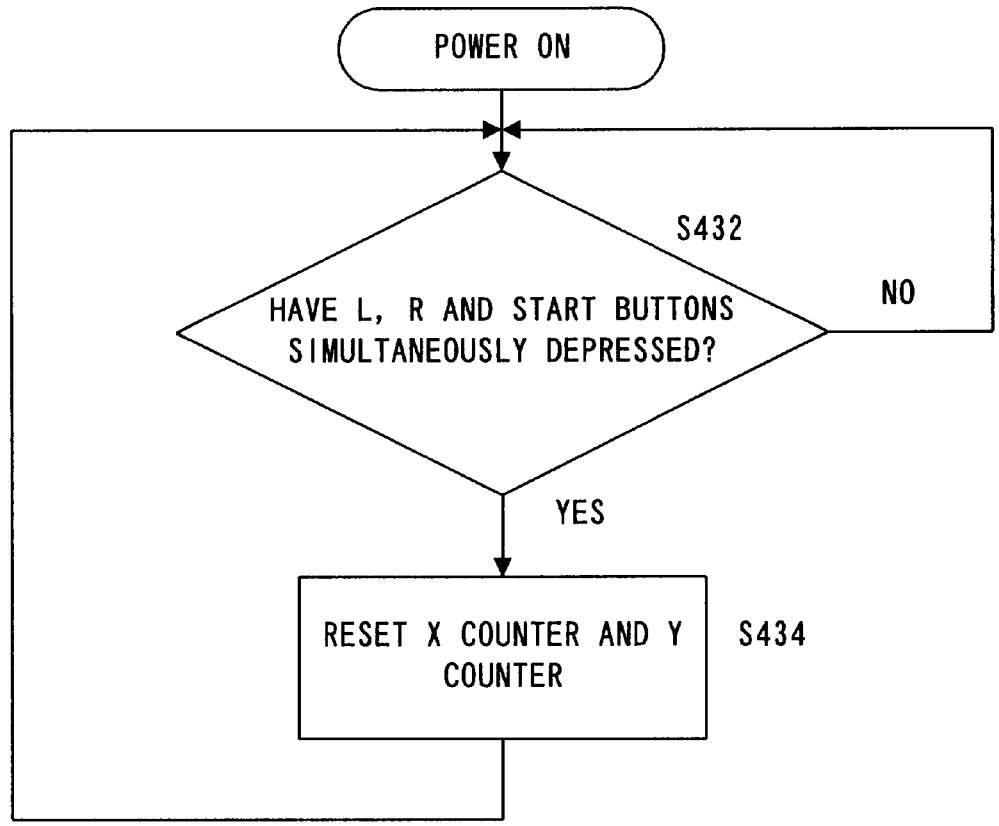
FIG. 25 is a flowchart showing a first method of origin point resetting.

With referring to a flowchart shown in FIG. 25, a reset operation of the counter 444 which stores data indicative of an inclined state of the joystick 45. First, in a step S432, the switch signal detection circuit 443 detects whether or not the buttons 406L 406R, and 405 are simultaneously depressed. Then, if the three buttons are not depressed, the detection of the switch signals is performed. Furthermore, if the three buttons are simultaneously depressed, the reset signal is outputted.

In response to the reset signal, in a step S434, the count values of the X counter 444X and the Y counter 444Y are reset. Therefore, the origin point of the joystick is determined at the point when the buttons 406L, 406R and 405 are simultaneously depressed.

In this embodiment, at a time that the buttons 406L, 406R and 405 are simultaneously depressed by the operator, the reset signal is generated by the switch signal detection circuit 443; however, the number of the buttons is not limited to three (3), and may be two (2) or four (4), etc. Furthermore, buttons simultaneously depressed are not limited to the above described buttons, and may be arbitrary buttons.

(2) A reset operation by turning-on/off the power source.

Figure 26:
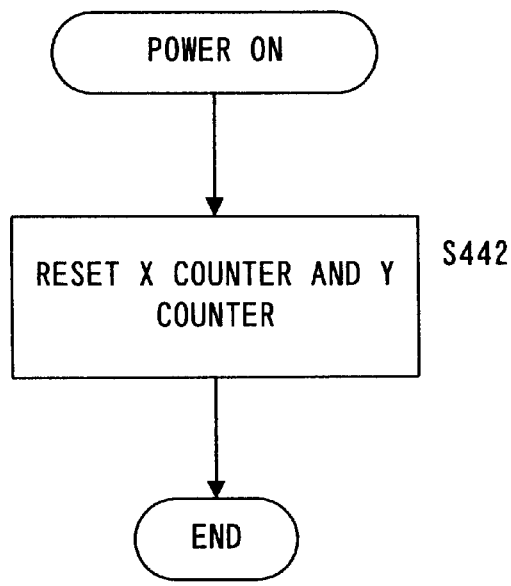
FIG. 26 is a flowchart showing a second method of origin point resetting.

With referring to a flowchart shown in FIG. 26, another reset operation of the counter 444 will be described. A reset signal is outputted from a power-on reset circuit 447 in response to a fact that a power source switch (not shown) of the image processor 10 is turned-on by the operator when the controller 40 is connected to the image processor 10, or in response to a fact that the power source is supplied to the controller 40 by inserting the connection jack of the controller 40 into one of the controller connectors 181–184 of the image processor 10 when no controller 40 is connected to the image processor 10. In response to such a reset signal, in a step S442, the count values of the X counter 444X and the Y counter 444Y are reset. Therefore, the origin point of the joystick is determined at the point when power is supplied to the controller 40.

(3) A reset operation by the image processor 10

The counter 444 is also reset by executing the steps S60 and S61 shown in the above described FIG. 23. Through such a reset operation, it is possible to freely determine the origin point of the joystick 45 by the program in accordance with a processing status of the image processor 10.

According to the above described methods, it is possible to reset the X counter 444X and the Y counter 444Y. If the reset signal is outputted at a time that the lever 474 is in its neutral position, that is, at a time that the lever 474 is not operated by the operator, it is possible to prevent erroneous count values from being stored in the X counter 444X and the Y counter 444Y, and therefore, it is possible to prevent the erroneous count values from being transmitted to the image processor 10

Figure 27:
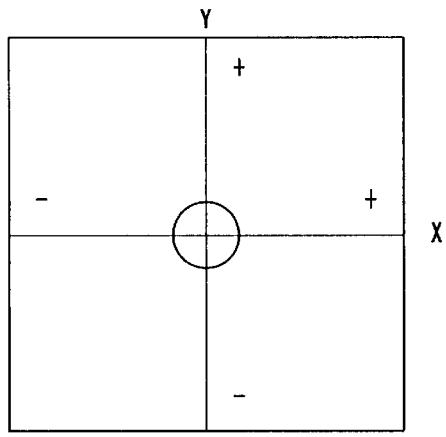
FIG. 27 is an illustrative view showing the correspondence of a physical coordinate of the joystick to a display screen.
Figure 27:
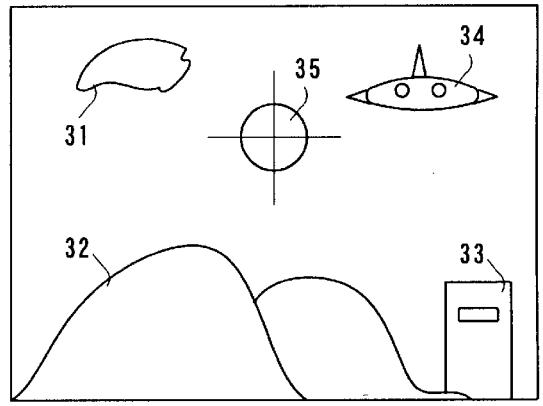

Next, one example where the monitor screen is changed with using the controller 40 will be described referring to FIG. 27. A left illustration in FIG. 27 shows the physically inclined amount of the lever 474 using the coordinates. More specifically, a circle illustrated at a center indicates the lever 474, and in this illustration, a state where the operator does not operate the lever 474, that is, a state where the lever 474 stands upright with respect to the housing. If the lever 474 is inclined toward a front side, the circle is moved in a +(positive) direction in the Y axis, and if the lever 474 is inclined toward a rear side, the circle is moved in a −(negative) direction of the Y axis. Furthermore, if the lever 474 is inclined toward a right direction, the circle is moved in a +(positive) direction of the X axis, and if the lever 474 is inclined toward a left side, the circle is moved in a −(negative) direction of the X axis.

A right illustration in FIG. 27 shows a display screen of a game where an enemy 34 is targeted by inclining the lever 474 toward front, rear, left and right so as to move an aiming device 35 toward upper, lower, left and right. Clouds 31, mountains 32 and buildings 33 constitute a background image which can be changed by scrolling and etc., the enemy 34 is an object which can freely move within the screen. For example, when the enemy 34 is displayed in a right upper portion of the screen, if the operator inclines the lever 474 toward right and then front, the X counter 444X and the Y counter 444Y are both incremented, and thus, the count values thereof become larger. The count values are transmitted to the image processor 10 which changes a display position of the aiming device 35 with utilizing the data of the count values. Therefore, the aiming device 35 becomes super-positioned on the enemy 34. Then, at a timing the aiming device 35 is just super-positioned on the enemy 34, if the button such as the button 404A is depressed, the switch data of the button is also transmitted to the image processor 10 similar to the counter data. Accordingly, the image processor 10 generates the image signal so as to display a missile (not shown) or the like which can attack the enemy 34 on the screen.

Next, one example of a case where the analog joystick is reset in a state where the lever 474 is deviated from the center, that is, the lever 474 is inclined will be described referring to FIG. 28.

Figure 28:
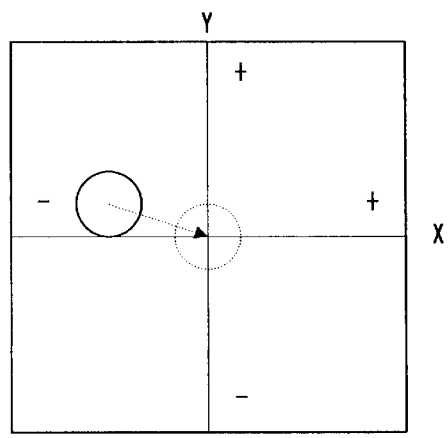
FIG. 28 is an illustrative view showing the correspondence of the physical coordinate of the joystick to the display screen when resetting an origin point.
Figure 28:
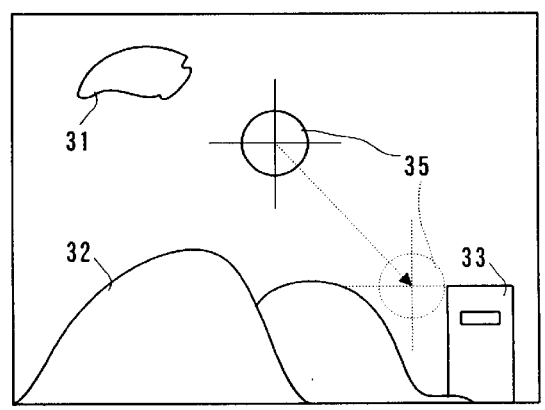

When the X counter 444X and the Y counter 444Y are reset at the coordinate position indicated by a solid circular line in a left illustration in FIG. 28, if the operator releases his or her hand from the lever 474, the lever 474 returns to the center of the coordinate, i.e., a position indicated by a dotted circular line. A change of the image will be described with utilizing a right illustration in FIG. 29. First, when the X counter 444X and the Y counter 444Y are reset, as similar to the right illustration in FIG. 29, the aiming device 35 is displayed at the solid circular line because the count values of the X counter 444X and the Y counter 444Y are both "O" equal to the initial values. Next, if the operator releases his or her hand from the lever 474, the lever 474 returns to the center position of the coordinate, and the X counter 444X within the controller 40 is incremented and the Y counter 444Y is decremented, and therefore, the count values of the counters 444X and 444Y become larger and smaller, respectively. The count values are transmitted to the image processor 10 which changes the display position of the aiming device 35 with utilizing the data of the count values to the position of an aiming device 35 indicated by a dotted line.

A description will be made a reset operation. For example, if the operator presumes the position that the enemy 34 appears is the position of the aiming device 35 shown by the dotted line in the right illustration in FIG. 29, the operator wishes to superimpose the aiming device 35 at the position of the dotted line aiming device 35 at an instant that the enemy 34 appears. However, if the aiming device 35 is continuously kept on the dotted line aiming device 35, the operator who is a game player becomes bored, and there is a further possibility that if the enemy 34 appears at a place not presumed, the operator cannot attack the enemy, and therefore, in order to superimpose the aiming device 35 on the position of the dotted line aiming device 35 at an instant that the enemy 34 appears, and to freely move the aiming device 35 to other places, the above described reset function is used.

In describing an action of the operator more specifically, the operator first inclines the lever 474 such that the aiming device 35 is displayed at a position symmetrically corresponding to the position presumed that the enemy 34 will appear (the position of the dotted line aiming device 35) with reference to the solid line aiming device 35. At that time, the physical coordinate position of the lever 474 becomes the solid circular line in the left illustration in FIG. 29. Then, the operator simultaneously depresses the three buttons of the buttons 406L, 406R and 405. In response to the depression, the X counter 444X and the Y counter 444Y are both reset, and the aiming device 35 is displayed at the position of the solid line aiming device 35. Then, the operator freely moves the aiming device 35, and waits for an appearance of the enemy 34. If the enemy 34 appears at the position of the dotted line aiming device 35, the operator releases the hand from the lever 474. Therefore, the lever 474 returns to the physical coordinate position shown by the dotted circular line in the left illustration in FIG. 29. Resultingly, the aiming device 35 becomes to be displayed at the dotted line aiming device 35. When the operator surely superimposes the aiming device 35 on the enemy 34, and depresses the switch such as the button 404A, a missile (not shown) or the like which attacks the enemy 34 displayed on the screen.

Furthermore, if the reset operation is performed in the above described manner, it is possible to largely move the lever 474 toward a right lower direction, and therefore, the above described reset operation is also effective at a time that the operator wishes to largely move the lever 474 toward a right lower direction.

Figure 29:
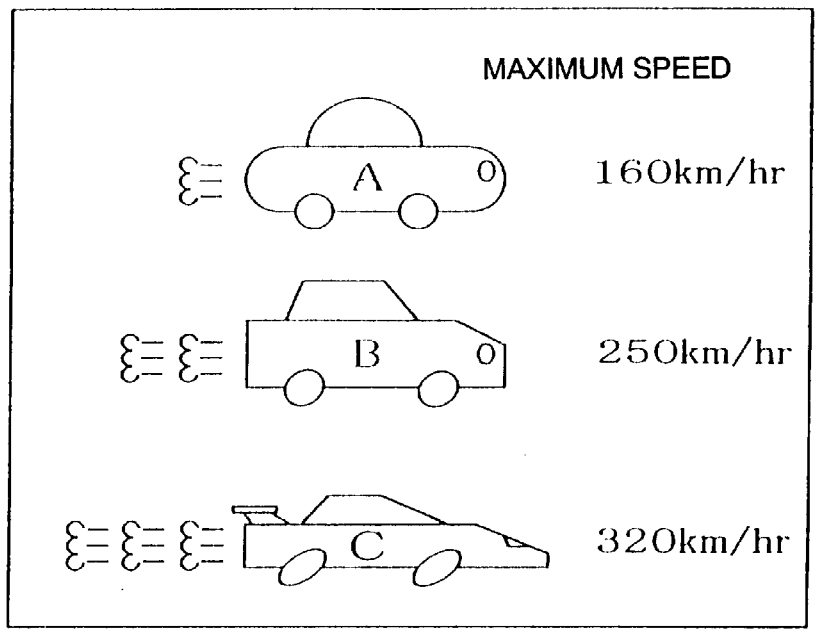
FIG. 29 is an illustrative view showing a display screen for selecting a racing car.

With reference to FIG. 29 to FIG. 34, explanation will be made on how to utilize in a game program the function of resetting the origin point of the joystick 45 to a desired point. It is assumed for example, in a game such as a racing game in which an object, e.g., a racing car, on a screen is operated based on maneuver by a user, that the maximum speed of a racing car is altered in conformity with the skill of a user. In such a case, a screen for selecting a racing car, for example as shown in FIG. 29, is displayed to select a desirable racing car by inclining the joystick 45 by the user. Where the user does not incline the joystick 45 at all, a racing car A with a maximum speed of 160 km/hr is selected. If the user inclines the joystick 45 toward this, i.e., in a direction corresponding to the downward of the screen, to a small extent (for example, by approximately 50% of the maximum inclination angle of the joystick 45), a racing car B with a maximum speed of 250 km/hr is selected. If the user inclines the joystick 45 toward this, i.e., in the direction corresponding to the downward of the screen, to a large extent (for example, by 90% or greater of the maximum inclination angle for the joystick 45), a racing car C with a maximum speed of 320 km/hr is selected. After selecting arbitrary one out of the racing cars A–C through the above operation, a racing scene begins in accordance with the maximum speed of the racing car. The higher the maximum speed of the racing car, the relative difficulty of the game is raised high and the score increases.

Figure 32:
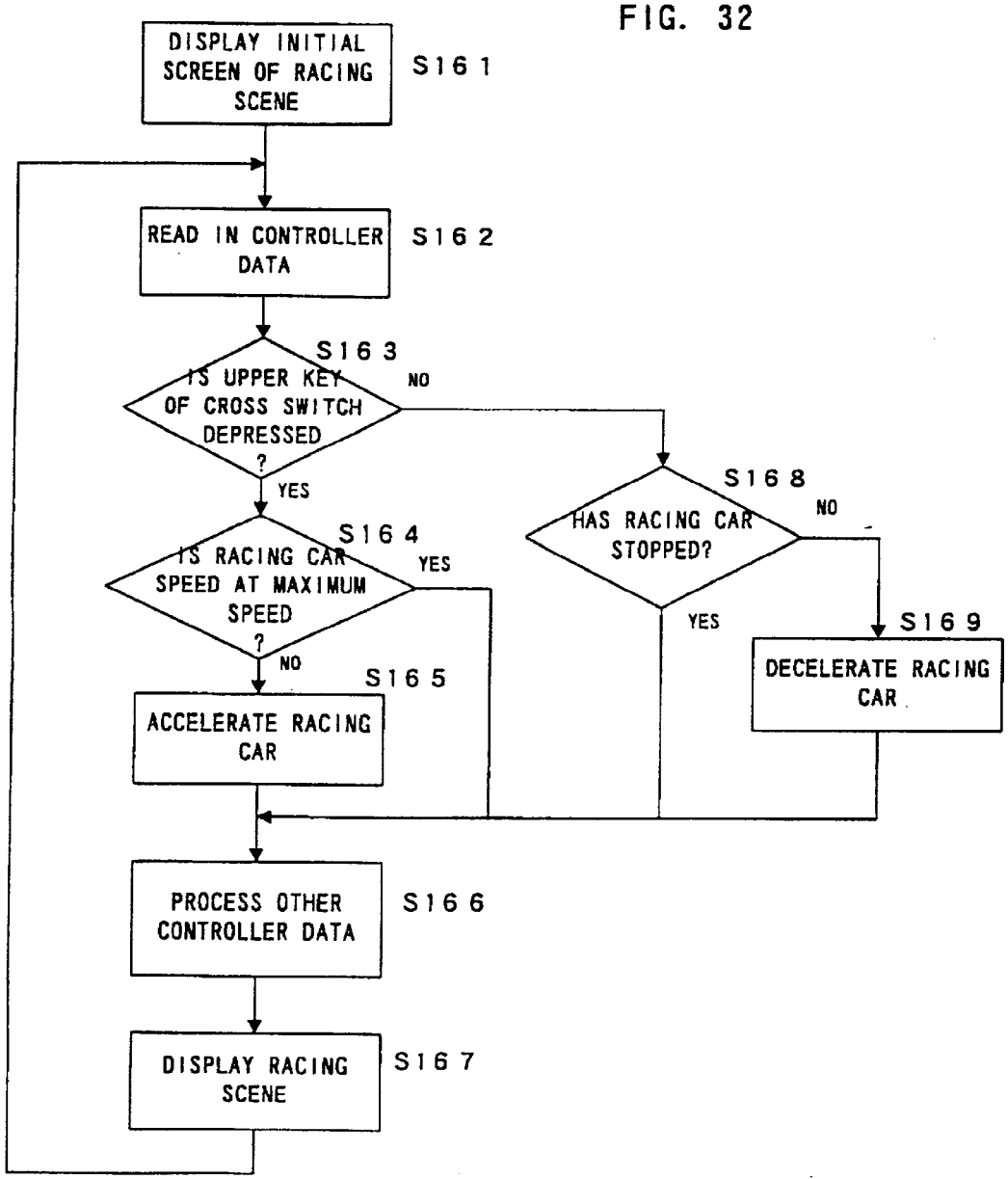
FIG. 32 is a flowchart showing the conventional operation for a racing game.

For a racing game like this, the selection and display of racing cars are conventionally made based on an algorithm as shown in FIG. 31 and FIG. 32. At a step S151 in FIG. 31, the CPU 11 executes a program for displaying an image as shown in FIG. 29 (e.g., a program for displaying the racing cars A–C according to a game program).

At a step S152, the CPU 11 reads information representative of an operating state of the controller. At a step S153, the CPU 11 determines whether a button for controller determination, e.g., the button A, is depressed or not. When it is determined that the button A is depressed, the process proceeds to a step S154 where it is determined from the position of a cursor which one of the racing cars A–C is selected. The value of the maximum speed is determined to one out of 160, 250 and 320 km/hr depending upon the racing car selected. If the maximum speed is determined, the process proceeds to a game scene at a step S155, that is, a main routine of the game.

Meanwhile, if it is determined at the step S153 that the button A is not depressed, the process proceeds to a step S156 where it is further determined whether the upper or lower key of the cross-shape button is depressed or not. When it is determined at the step S156 that either of the upper or lower key of the cross button is depressed, the cursor for selecting a racing car is moved in dependence upon the depressed key and thereafter the process returns to the step S152. If it is determined that neither of the upper nor lower keys is depressed, the process immediately returns to the step S152.

After determining the kind and the maximum speed of a racing car in this manner, the process proceeds to the main routine of the game of FIG. 32. At a step S161 in FIG. 32, an initial scene of racing scene, for example a starting site, etc. as shown in FIG. 30, is displayed on the screen. At a step S162, controller data is read out. At a step S163, it is determined whether or not the upper key of the cross button is depressed, based on which it is determined whether or not acceleration of the racing car is desired by the user. If it is determined that the user desires acceleration of the racing car, the process proceeds to a step S164 where it is determined whether the speed of the racing car has already attained its maximum speed or not. Where the speed of the racing car has not yet reached the maximum speed, the racing car is accelerated at a step S165 and thereafter the process proceeds to a step S166. Where the speed of the racing car already reached the maximum speed, the process proceeds to a step S166 without executing the step S165. At the step S166, other processing, e.g., handle-manipulation processing, is performed based on the controller data read out at the step S162. At a step S167, racing scenes are displayed on the screen based on the result of these steps S162–S166.

On the other hand, where it is determined at the step S163 that the user does not desire acceleration for the racing car, it is determined that the user has a desire to decelerate the racing car, and the process proceeds to a step S168. At the step S168 it is determined whether or not the racing car has already stopped. If determined that it is already stopped, the process proceeds to the step S166 without executing a step S169. Where it is determined that the racing car is not yet stopped, deceleration is made for the racing car at the step S169, and thereafter the process proceeds to the step S166. At the step S166, other controller data processing is performed but for the cross key. Then, At a step S167, a racing scene is displayed, and the process proceeds to the step S162.

Figure 33:
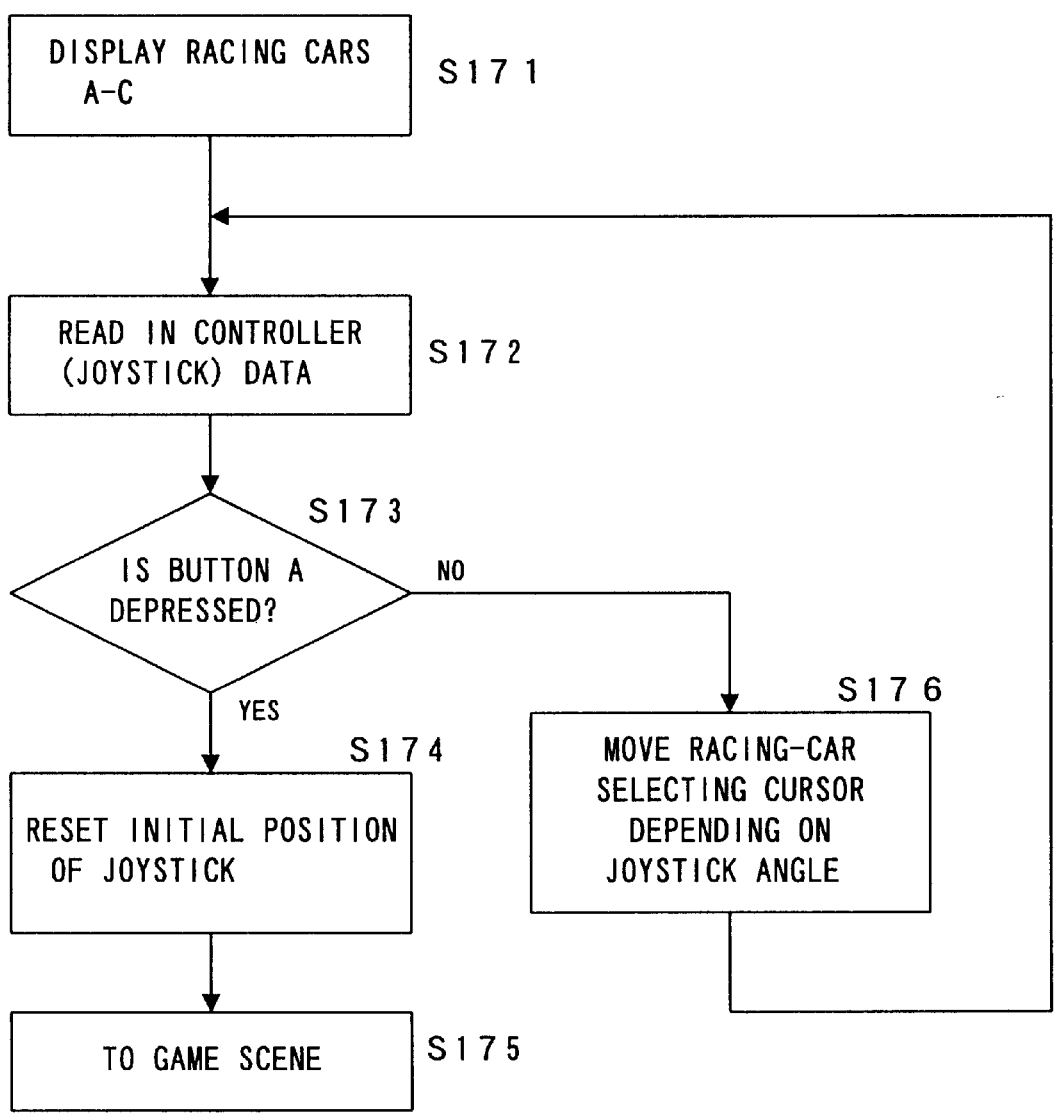
FIG. 33 is a flowchart showing the operation for selecting in the embodiment a racing car.
Figure 34:
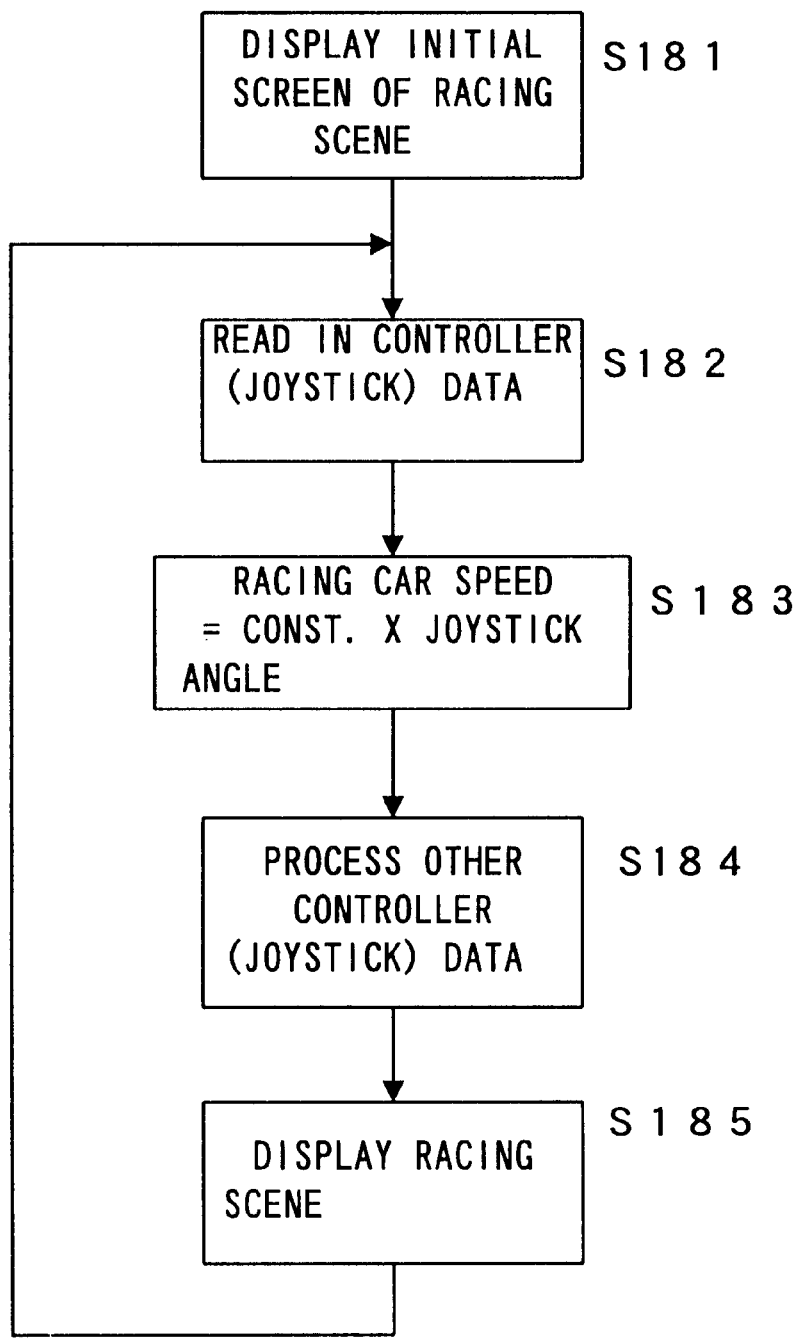
FIG. 34 is a flowchart showing the operation of a racing game in accordance with an example embodiment of the present invention.

Explained above is an algorithm concerning selection of a maximum speed of a racing car and control thereof when a controller of the conventional art is employed. On the contrary, where using an analog joystick of the above embodiment in which origin point that may be reset algorithms as illustrated in FIG. 33 and FIG. 34 apply. In particular, it should be noted that the algorithm of FIG. 34 is largely simplified in comparison with the corresponding prior art algorithm of FIG. 32.

At a step S171 in FIG. 33, racing cars A–C are displayed on the screen. At a step S172, the CPU 11 reads in a state of the analog joystick in the aforesaid way. At a step S173, the CPU 11 determines whether the button 404A (hereinafter described as the button A) is depressed or not. If depression of the button A is determined, a racing car to be used for the racing game is determined at a step S174, and further the origin point is reset by taking the inclined angle of the joystick at that time as 0. Thereafter, at a step S175 the process proceeds to a main routine of the racing game.

On the other hand, if the button A is not depressed is determined, at a step S176 the racing car selecting cursor is displayed at a position corresponding to the inclined angle of the joystick. That is, where the overall range of the analog joystick inclining angle is taken 45 degrees to –45 degrees, when the angle is at 0 degree to –15 degrees the cursor is displayed at a position of the racing car A, when –15 degrees to –30 degrees the cursor is displayed at a position of the racing car B, and when –30 degrees or greater the cursor is displayed at a position of the racing car C. After the cursor is displayed, the process returns again to the step S172. As explained as above, it is possible in this embodiment to omit the step S156 of the conventional art.

Using FIG. 34, explanation will be made for a main routine of the racing game in the case of using the analog joystick of the embodiment. At a step S181, an initial screen for example with a racing scene of FIG. 30 is displayed. At a step 182, an operating state of the analog joystick is read in. At a step S183, the inclination angle of the joystick is multiplied by a predetermined constant to determine the speed of the racing car. At this time, the inclination angle of the joystick is different in dependence upon the kind of the racing cars. This is because for the racing car A when the inclination angle during selection of a racing car at the step S174 is for example 0 degrees the count value of the counter circuit 444 is reset to 0 degrees, for the racing car B when the inclination angle during selection of a racing car is for example −15 degree the count value of the counter circuit 444 is reset to 0 degrees, and for the racing car C when the inclination angle during selection of a racing car is for example −30 degrees the count value of the counter circuit 444 is reset to 0 degrees. Accordingly, when the joystick is forwardly, fully inclined, the inclination angle is 45 degrees for the racing car A, 60 degrees for the racing car B, and 75 degrees for the racing car C. In this manner, even if the joystick is operated by the user in a similar way, the inclination angle obtainable differs by the kind of a racing car. That is, the speed of a racing car, in particular the maximum speed, is different. Furthermore, the present application does not require a complicated speed control routine such as the steps S163 to steps S1 65, the step S168 and the step S169, but provides a program function equivalent thereto by having only the step S183.

In this manner, after determining the speed of the racing car, other joystick data are processed at a step S184, and a racing scene is displayed at a step S185.

In this embodiment, since the program processing amount is decreased by reducing the number of steps, realization is made for reduction of programmer's operating time as well as simplification of operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An operating device adapted for being connected during use to an image processing apparatus that generates image data to be displayed on a display according to a program, to supply a signal for providing variation to the image data to be generated by an image processing apparatus, said operating device comprising:
    an operating member supported to be tilt-operated by an operator so as to incline within a predetermined range and resting, when not operated by the operator, at a predetermined position;
    a rotating member arranged for rotation depending upon an inclination amount of said operating member;
    a rotation detecting means for detecting a rotational state of said rotating member;
    a count means for varying a count value thereof depending on a rotational amount of said rotating member detected by said rotation detecting means;
    a reset signal generating means for resetting the count value of said count means for an arbitrary tilt position of said operating member so that after resetting, the count means counts using the arbitrary tilt position as a new origin; and
    a transfer means for transferring the count value counted by said count means to said image processing apparatus.

2. An operating device according to claim 1, wherein said reset signal generating means generates the reset signal for resetting the count value of said count means in response to a reset signal from said image processing apparatus.

3. An operating device according to claim 2, wherein the reset signal from said image processing apparatus is generated according to the program by said image processing apparatus.

4. An operating device according to claim 1, further having a switch means for generating an electric signal when depressed by the operator, wherein said reset signal generating means generates the reset signal in compliance with the electric signal from said switch means.

5. An operating device according to claim 4, wherein said switch means includes a plurality of switches, and said reset signal generating means resets the count value of said count means depending upon simultaneous depression of predetermined one of said plurality of switches.

6. An operating device according to claim 1, further having a connecting member for transmitting as rotational movement the inclination of said operating member to said rotating member, wherein said rotating member is connected to said connecting member to be rotated through an angle greater than an inclination angle of said operating member.

7. An operating device according to claim 6, wherein said connecting member and said rotating member are connected to each other by gears having a predetermined gear ratio.

8. An imaging processing system having an image processing apparatus for generating image data to be displayed on a display according to a program, and an operating device for being connected during use to said image processing apparatus so as to supply a signal for providing variation to the image data to be generated by said image processing apparatus,
    wherein said image processing apparatus includes:
        a program memory stored with a program for image processing;
        a first receiver receiving data generated by said operating device;
        a central processor generating command data according to the program stored in said program memory, and generating image data depending upon the program and the data received by said first receiver;
        a first transmitter transmitting the command data generated by the central processor to said operating device; and
        an image signal generator generating an image signal for displaying an image on the display depending upon the image data from said central processor; and
    wherein said operating device includes:
        an operating member supported to be tilt-operated to be inclined within a predetermined range by the operator and rested, when not operated by an operator, at a predetermined position;
        a rotating member arranged for rotation depending upon an inclination amount of said operating member;
        a rotation detector detecting a rotational state of said rotating member;
        a counter having a count value varied depending on the rotational amount of said rotating member detected by said rotation detector;
    a reset signal generator resetting the count value of the counter for an arbitrary tilt position of said operating member so that after resetting, the count means counts using the arbitrary tilt position as a new origin; and
        a second receiver receiving the command data transmitted from said first transmitter;
        an output generator outputting data of the count value counted by said counter in response to reception of predetermined command data by said second receiver; and
        a second transmitter transmitting the data of count value outputted by said output generator to said image processing apparatus.

9. An image processing system according to claim 8, wherein the command data includes reset command data, and said reset signal generator generates the reset signal in response to reception of the reset command data by said second receiver.

10. An image processing system according to claim 9, wherein said operating member further generates selection determining data for transmitting to said image processing apparatus that the operator has selected part of an image being displayed on the display, said image processing apparatus further having a reset request command data generator generating reset request command data for resetting said counter in a state that said operating member is inclined at a predetermined angle in a predetermined direction based on the selecting data received by said first receiver, said reset signal generator resetting said counter based on the reset request command data received by said second receiver, whereby the count value from said counter obtained upon operating said operating member by the operator is varied to alter the degree of variation of the image data responsive to operation by the operator taking into account the inclined state of the operating member at the time of resetting.

11. A device coupled during use to a graphics processor that generates graphics data to be displayed on a display according to a program that supplies a graphics control signal used by the graphics processor to vary the graphics data displayed on the display, comprising:

a base including a pivotal support;

an operating member, pivotally supported at one end by the pivotal support, that can be inclined about the pivotal support by an operator to a plurality of inclined positions;

a detector detecting an amount that the operating member is inclined from an origin position of the operating member;

a counter generating a count value depending on the detected amount; and a controller changing the origin position of the operating member from a first origin position to a second origin position in response to an input signal, wherein the counter generates a count value for a subsequent detected amount the operating member is inclined from the second origin position in response to the change by the controller.

12. The device in claim 11, wherein the base includes a horizontal plane and wherein a neutral position of the operating member corresponds to the operating member being substantially perpendicular with the horizontal plane.

13. The device in claim 12, wherein the first origin position corresponds to the neutral position.

14. The device in claim 12, wherein the first origin position differs from the neutral position.

15. The device in claim 12, wherein the first and second origin positions differ from the neutral position.

16. The device in claim 11, wherein the input signal is a reset signal.

17. The device in claim 11, wherein the input signal is generated when power is applied or removed to the graphics device.

18. The device in claim 11, further comprising:

a plurality of actuators, wherein the input signal is generated when one or more of the actuators is actuated by the operator.

19. The device in claim 18, wherein the input signal is generated when two or more of the actuators are simultaneously actuated by the operator.

20. The graphics device in claim 11, wherein the input signal is generated in response to a signal generated by the graphics processor.

21. The device in claim 20, wherein the signal generated by the graphics processor corresponds to parameters for establishing how the graphics processor varies the graphics data to be generated based on an inclination of the operating member.

22. The device in claim 11, wherein the operating member is a joystick, the graphics controller is a game controller, and the program includes a game program.

23. The device in claim 11, further comprising:

a first swing member rotatably supported in the base about a first horizontal axis and having a first slot for receiving the operating member, and a second swing member rotatably supported in the base above the first swing member and rotatable about a second horizontal axis perpendicular to the first horizontal axis and having a second slot for receiving the operating member;

wherein movement of the operating member causes the first and second swing members to rotate about their respective first and second horizontal axes.

24. The device in claim 23, wherein the first and second swing members are biased to bring the operating member to a neutral position of the operating member.

25. The device in claim 23, further comprising:

a first rotatable member coupled to the first swing member and rotating as the first swing member rotates, and a second rotatable member coupled to the second swing member and rotating as the second swing member rotates.

26. The device in claim 25, wherein the detector includes:

a first rotation detector detecting rotation of the first rotatable member and generating first rotation pulses, and a second rotation detector detecting rotation of the second rotatable member and generating second rotation pulses.

27. The device in claim 26, wherein the counter includes:

a first counter generating a count in accordance with the first rotation pulses, and a second counter generating a count in accordance with the second rotation pulses.

28. The device in claim 26, wherein the first and second rotation detectors are photo-optical detectors.

29. The device in claim 23, further comprising:

a guide well supported above the first swing member guiding inclined movement of the operating member in a plurality of directions.

30. The device in claim 29, wherein the guide well is conical in shape and includes a plurality of abutting, tapered panels.

31. A method for operating a device coupled during use to a graphics processor that generates graphics data to be displayed on a display according to a program, the device having an operating member moveable by an operator to supply a graphics control signal used by the graphics processor to vary the location of an object displayed on the display, comprising:

moving the object on the display based on measured movement of the operating member from a first reference position from which movement of the operating member is measured;

detecting an indication to change the reference position of the operating member;

determining a current position of the operating member when the indication of change is detected;

establishing the current position as a second reference position;

measuring movement of the operating member relative to the second reference position; and moving the object on the display based on the measured movement of the operating member from the second reference position.

32. The method in claim 31, wherein the indication to change the first reference position is a reset signal.

33. The method in claim 31, wherein the indication is an actuation of one or more actuators on the device.

34. The method in claim 31, wherein the indication is an actuation of two or more actuators on the device.

35. The method in claim 31, wherein the indication is a power on/off indication with respect to power supplied to the device.

36. The method in claim 31, wherein the indication is a signal provided by the graphics processor.

37. The method in claim 31, wherein the program is a video game and the indication is a signal used by the graphics processor to establish one or more parameters of the video game.

38. The method in claim 31, wherein the operating member moves to a neutral position when the operating member is not being manipulated by the operator and the first or second reference position corresponds to the neutral position.

39. The method in claim 31, wherein the operating member moves to a neutral position when the operating member is not being manipulated by the operator and neither the first nor second reference position corresponds to the neutral position.

40. The method in claim 31, wherein the operating member is a joystick which is inclined with respect to a pivot point and the determining step includes determining an amount and a direction of inclination of the joystick.

* * * * *